(12) United States Patent
Deephanphongs et al.

(10) Patent No.: US 10,134,048 B2
(45) Date of Patent: Nov. 20, 2018

(54) AUDIENCE ATTENDANCE MONITORING THROUGH FACIAL RECOGNITION

(71) Applicant: GOOGLE LLC, Mountain View, CA (US)

(72) Inventors: David Deephanphongs, San Francisco, CA (US); Ken Krieger, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/454,490

(22) Filed: Aug. 7, 2014

(65) Prior Publication Data

US 2014/0344017 A1    Nov. 20, 2014

Related U.S. Application Data

(60) Division of application No. 13/831,259, filed on Mar. 14, 2013, now Pat. No. 10,034,049, which is a
(Continued)

(51) Int. Cl.
*H04H 60/56* (2008.01)
*G06Q 30/02* (2012.01)
(Continued)

(52) U.S. Cl.
CPC ..... *G06Q 30/0201* (2013.01); *G06K 9/00228* (2013.01); *G06K 9/00362* (2013.01);
(Continued)

(58) Field of Classification Search
None
See application file for complete search history.

(56) References Cited

U.S. PATENT DOCUMENTS 7,669,213 B1 *  2/2010  Wick ................ H04L 51/043
                                              725/37
8,850,469 B1 *  9/2014  Yang ............... H04N 21/25841
                                              725/135
(Continued)

OTHER PUBLICATIONS

Google Inc., International Search Report and Written Opinion, PCT/US2013/050951, dated Dec. 23, 2013, 8 pgs.
(Continued)

*Primary Examiner* — Jason K Lin
(74) *Attorney, Agent, or Firm* — Morgan, Lewis & Bockius LLP

(57) ABSTRACT

In accordance with some implementations, a method for measuring viewership of media content is disclosed. The method is performed on a client system. The client system captures visual data of one or more users of the client system with the camera. The client system then analyzes the captured visual data to determine a facial image for each respective user of the one or more users. Based on the facial image, the client system then determines if a respective user is a participant in a media viewership study. In accordance with a determination that the user is a participant in the media viewership measurement study, the client system determines the media content being presented. The client system creates viewership data based on the user and the media content being displayed in the proximity of the user and transmits viewership data to a server system.

23 Claims, 15 Drawing Sheets

Related U.S. Application Data continuation-in-part of application No. 13/552,579, filed on Jul. 18, 2012, now abandoned.

(51) Int. Cl.
| | |
|---|---|
| *H04N 21/258* | (2011.01) |
| *H04N 21/4223* | (2011.01) |
| *H04N 21/442* | (2011.01) |
| *H04N 21/658* | (2011.01) |
| *H04N 21/25* | (2011.01) |
| *G06K 9/00* | (2006.01) |

(52) U.S. Cl.
CPC ..... *H04N 21/251* (2013.01); *H04N 21/25866* (2013.01); *H04N 21/4223* (2013.01); *H04N 21/44218* (2013.01); *H04N 21/6582* (2013.01)

(56) References Cited

U.S. PATENT DOCUMENTS

| | | | | |
|---|---|---|---|---|
| 8,913,103 | B1* | 12/2014 | Sargin | G06K 9/00221 348/14.12 |
| 9,204,189 | B1* | 12/2015 | Oztaskent | H04N 21/2407 |
| 2002/0076100 | A1* | 6/2002 | Luo | G06K 9/00228 382/164 |
| 2005/0289582 | A1* | 12/2005 | Tavares et al. | 725/10 |
| 2006/0230415 | A1 | 10/2006 | Roeding | |
| 2008/0091512 | A1* | 4/2008 | Marci et al. | 705/10 |
| 2008/0222671 | A1* | 9/2008 | Lee et al. | 725/10 |
| 2009/0133051 | A1* | 5/2009 | Hildreth | H04N 21/4532 725/28 |
| 2009/0313232 | A1* | 12/2009 | Tinsley et al. | 725/9 |
| 2010/0070987 | A1* | 3/2010 | Amento et al. | 725/10 |
| 2010/0211967 | A1* | 8/2010 | Ramaswamy et al. | 725/14 |
| 2011/0072448 | A1 | 3/2011 | Stiers et al. | |
| 2011/0141010 | A1 | 6/2011 | Sakata et al. | |
| 2011/0221913 | A1* | 9/2011 | Nagai et al. | 348/208.1 |
| 2011/0289524 | A1* | 11/2011 | Toner | H04H 60/31 725/14 |
| 2012/0123826 | A1* | 5/2012 | French | G06Q 30/0207 705/14.1 |
| 2012/0124161 | A1* | 5/2012 | Tidwell | G06F 21/6254 709/217 |
| 2012/0124604 | A1* | 5/2012 | Small | H04N 21/4223 725/12 |
| 2012/0163679 | A1* | 6/2012 | Gavita | G07C 9/00158 382/118 |
| 2012/0324494 | A1* | 12/2012 | Burger | H04H 60/33 725/12 |
| 2013/0227595 | A1* | 8/2013 | Nielsen | H04H 60/45 725/11 |
| 2014/0007148 | A1 | 1/2014 | Ratliff et al. | |
| 2014/0026158 | A1* | 1/2014 | Rowe | H04H 60/31 725/18 |
| 2014/0157329 | A1* | 6/2014 | Roberts | H04L 67/10 725/61 |
| 2014/0282645 | A1* | 9/2014 | Hammond | H04N 21/44218 725/12 |

OTHER PUBLICATIONS

Google Inc., International Preliminary Report on Patentability, PCT/US2013/050951, dated Jan. 20, 2015, 6 pgs.
Google Inc., Notification of First Office Action, CN201380047953.7, dated Nov. 11, 2016, 7 pgs.

* cited by examiner

AUDIENCE ATTENDANCE MONITORING THROUGH FACIAL RECOGNITION

RELATED APPLICATION

This application is a divisional of U.S. patent application Ser. No. 13/831,259, filed Mar. 14, 2013, which is a continuation-in-part of U.S. patent application Ser. No. 13/552,579, filed Jul. 18, 2012. Content of both of the above applications is hereby incorporated by reference in its entirety.

TECHNICAL FIELD

The disclosed implementations relate to the field of displaying media content generally and in particular to using facial recognition to monitor audience attendance.

BACKGROUND

There are currently many avenues for users to consume media content. In addition to traditional, non-interactive avenues such as traditional television, radio, or projection screens in movie theatres, new electronic devices provide additional avenues to consume media content, such as streaming content over the Internet via computers, smart phones, or tablets. Some of these additional avenues are interactive and allow users to interact with the distributors of media content. This increased interaction allows distributors or producers of media content to provide more personalized services to the consumers of the media content.

One option for producers or distributors of media content to provide personalized services is through a recommendation engine. Such engines select new media content to recommend to the user based on information known about a user. Increasing the amount of information that a recommendation engine has concerning a specific user increases the accuracy of the recommendation engine to correctly recommend media content that the user will find interesting. As a result, gathering information concerning what media content a user finds interesting and what media content a user does not find interesting is important to providing a good user experience.

The new avenues for viewing media content allow additional interaction that allows media content distributors to more efficiently gather information relating to a user's interest. Generally, the user indicates interest in a piece of media content by selecting a level of interest or otherwise rating the media content. Many recommendation systems are integrated directly into media content display platforms and allow users to indicate whether or not they found a particular piece of media content interesting.

In addition to measuring the interest of a user or group of users, producers and distributors of media content need to measure or approximate the total number of users viewing a given piece of media content at any given time. This information is then used by producers and distributors of media content to compare the relative popularity of various pieces of media content. Relative popularity can then used to determine rates for advertisements associated with the media content.

Traditionally, total viewership data is gathered by conducting studies that sample a group of users from a population. Users record their viewership habits and that information is used to estimate total viewership statistics. These studies rely on accurate user records to provide the most accurate statistics. Other methods measure total number of downloads or the amount of data streamed. These methods rely on the user to accurately report the necessary demographic information to collect accurate and useful statistics.

SUMMARY

In accordance with some implementations, a method for determining viewer interest is disclosed. The method is performed on a client system having one or more processors, a camera, and memory storing one or more programs for execution by the one or more processors. The client system captures visual data of a user of the client system with the camera. The client system analyzes the captured visual data to detect physical indicia of interest associated with a user of the client system. The client system then determines a level of interest of the user with respect to media content being displayed in the proximity of the users based on the detected physical indicia of interest. The client system then sends the determined level of interest to a server system which maintains an interest profile for the user of the client system. The client system then receives, from the server system, recommendations for additional media content for the user based, at least in part on, the determined level of interest.

In accordance with some implementations, a client system for determining viewer interest is disclosed. The client system has one or more processors, a camera, and memory storing one or more programs to be executed by the one or more processors. The one or more programs include instructions for capturing visual data of a user of the client system with the camera. In some implementations, the client system includes instructions for analyzing the captured visual data to detect physical indicia of interest associated with a user of the client system. The client system also includes instructions for determining a level of interest of the user with respect to media content being displayed in the proximity of the users based on the detected physical indicia of interest. In some implementations, the client system also includes instructions for sending the determined level of interest to a server system; the server system including an interest profile for the user of the client system. In some implementations, the client system further includes instructions for receiving, from the server system, recommendations for additional media content for the user based, at least in part on, the determined level of interest.

In accordance with some implementations, a non-transitory computer readable storage medium storing one or more programs configured for execution by a client system with an associated camera is disclosed. The one or more programs also include instructions for capturing visual data of a user of the client system. The one or more programs further include instructions for analyzing the captured visual data to detect physical indicia of interest associated with a user of the client system. The one or more programs also include instructions for determining a level of interest of the user with respect to media content being displayed in the proximity of the users based on the detected physical indicia of interest. The one or more programs may also include instructions for sending the determined level of interest to a server system; the server system including an interest profile for the user of the client system. The one or more programs further include instructions for receiving, from the server system, recommendations for additional media content for the user based, at least in part on, the determined level of interest.

In accordance with some implementations, a method for measuring viewership of media content is disclosed. The method is performed on a client system having one or more processors, a camera, and memory storing one or more programs for execution by the one or more processors. The client system captures visual data of one or more users of the client system with the camera. The client system then analyzes the captured visual data to determine a facial image for each respective user of the one or more users. Based on the determined facial image, the client system then determines if a respective user of the one or more users is a participant in a media viewership study. In accordance with a determination that the respective user is a participant in the media viewership measurement study, the client system determines the media content being displayed in the proximity of the user. The client system creates viewership data based on the user and the media content being displayed in the proximity of the user and transmits viewership data to a server system.

In accordance with some implementations, a client system for determining viewer interest is disclosed. The client system has one or more processors, a camera, and memory storing one or more programs to be executed by the one or more processors. The one or more programs include instructions for capturing visual data of one or more users of the client system with the camera. The one or more programs include instructions for analyzing the captured visual data to determine a facial image for each respective user of the one or more users. The one or more programs include instructions for, based on the determined facial image, determining if a respective user of the one or more users is a participant in a media viewership study. The one or more programs include instructions for, in accordance with a determination that the respective user is a participant in the media viewership measurement study, determining the media content being displayed in the proximity of the user. The one or more programs include instructions for creating viewership data based on the user and the media content being displayed in the proximity of the user and transmitting viewership data to a server system.

In accordance with some implementations, a non-transitory computer readable storage medium storing one or more programs configured for execution by a client system with an associated camera is disclosed. The client system has one or more processors, a camera, and memory storing one or more programs to be executed by the one or more processors. The one or more programs include instructions for capturing visual data of one or more users of the client system with the camera. The one or more programs include instructions for analyzing the captured visual data to determine a facial image for each respective user of the one or more users. The one or more programs include instructions for, based on the determined facial image, determining if a respective user of the one or more users is a participant in a media viewership study. The one or more programs include instructions for, in accordance with a determination that the respective user is a participant in the media viewership measurement study, determining the media content being displayed in the proximity of the user. The one or more programs include instructions for creating viewership data based on the user and the media content being displayed in the proximity of the user and transmits viewership data to a server system.

BRIEF DESCRIPTION OF THE DRAWINGS

Like reference numerals refer to corresponding parts throughout the drawings.

DESCRIPTION OF IMPLEMENTATIONS

Figure 1:
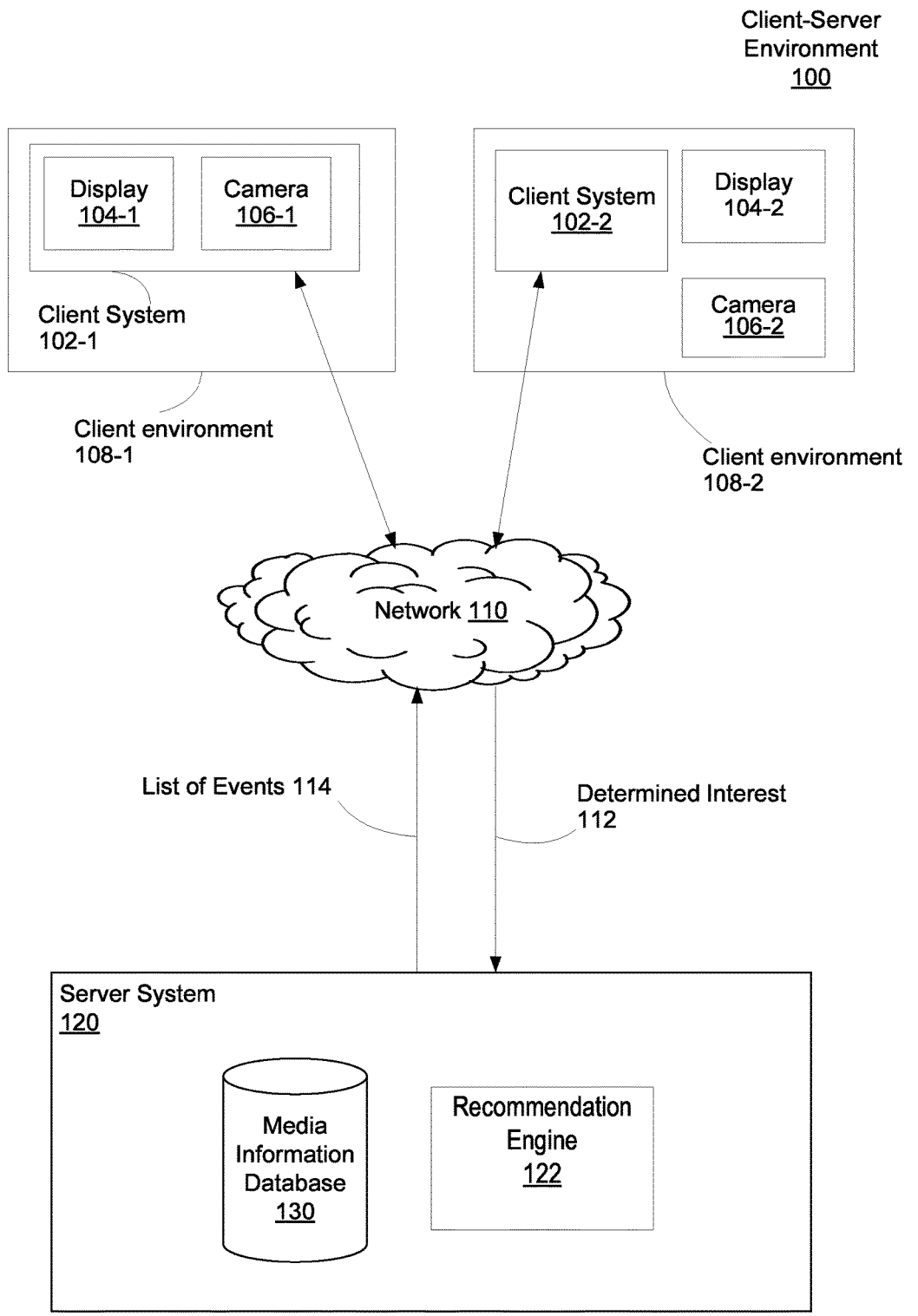
FIG. 1 is a block diagram illustrating a client/server environment including a client system with a display in accordance with some implementations.

In some implementations, a user of a client system views media content via the client system on either a display integrated into the client system or associated with the client system. Providers of the media content find great value in determining the user's attentiveness to the displayed media content as knowing the user's interest in media content can help media providers tailor future content or recommendations more closely to the user's interests. Additionally, some users find it useful to have future content tailored more closely to their interests. As such, users may consent to allow the client system and the server system to gather information concerning the users' interests for the purposes of providing enhanced user experiences. Accordingly, in some implementations, a user's interest in displayed media is determined by analyzing visual data of the user (such as visual data from photographs or video) for physical indicia of user interest. An advantage of such an implementation is that the user does not have to actively indicate their interest to the system. However, if a respective user does not wish to participate in the user interest monitoring system, the client system and server system will not gather or store information concerning the respective user's interests. In this way, the system does not violate the privacy of users.

In some implementations the client system includes the ability to detect physical indicia associated with a user. For example, the client system has access to an associated camera or a microphone. The client system then uses the camera to capture and store visual information about the user. The client system then analyzes the captured visual information for any physical indicia of interest in media content.

In some embodiments, determining physical indicia of interest includes determining the position of the eyes of the user using gaze tracking techniques. For example, the client system uses the position and orientation of each eye to determine where the user is looking relative to the display. By determining where the user is looking the client system is able to determine whether the user is focusing on the display. If the user is determined to be focusing on the display associated the client system determines on what portion of the screen the user is focusing. In some implementations, the client system then uses this information to determine a level of interest for the user associated with the media currently being displayed.

In some implementations, the physical indicia of interest determined from the visual information include the position of a user's head. By analyzing the position of the user's head, the client system is able to estimate where the user is looking and consequently, determine whether the user is looking at the display. The client system then estimates user interest in the currently displayed media. In other implementations, the determined physical indicia of interest include the user's body lean. In other implementations, the determined physical indicia of interest is a user's reaction to a visual or audio event that occurs in the media being displayed. For example, a user who physically reacts to a surprising visual or startling loud sound in a movie (e.g. by jumping or screaming) is likely more interested in the movie they are watching than a user who does not react to a loud sound in a movie.

In some implementations, an audio event includes information about a song currently playing. The information includes the beats per minute for a song (or the frequency or periodicity). The client system 102 then analyzes captured visual information to determine whether the user is moving with a periodicity (or frequency or beats per minute) that matches the periodicity of the detected song. A user moving (dancing for example) with the same frequency of a song indicates positive user engagement with the presented audio event. For example, if a song is playing alone or as part of the soundtrack of a movie users who are very engaged with the currently presented media are more likely to move in time (dance) with the music.

In some implementations, the client system sends the determined interest level to a server system for further processing, storage, and use (in a recommendation system, for example). In some implementations, the client system removes personally identifiable information before sending the interest information to the server system. In some implementations the user is able to log onto a service that tracks interest information over time and keeps an interest profile for the user.

In some implementations, the server system uses the determined interest received from the client system to increase the accuracy of recommendation systems. For example, the determined interest can be used to select specific genres, performers, or topics that the user finds interesting. In some implementations these recommendations can be presented to the user for selection. In some implementations, the client system automatically begins displaying the most highly recommended media without user interaction. In some implementations the user must select the specific media to be displayed.

FIG. 1 is a block diagram illustrating a client-server environment 100, in accordance with some implementations. The client-server environment 100 includes a client system 102 which is part of a client environment 108 and a server system 120. In some implementations, the client system 102-1 includes a display 106-1 and a camera 104-1. In some implementations, the user environment 108-2 includes a camera 104-2 and a display 106-2 associated with the client system 102-2 but not integrated into the client system 102-2. The server system 120 includes a recommendation engine 122 and a media information database 130. The communication network interface 112 may connect to any of a variety of networks, including local area networks (LAN), wide area networks (WAN), wireless networks, wired networks, the Internet, or a combination of such networks.

In accordance with some implementations, the client environment 108-1 includes a client system 102. In some implementations, the client system 102-1 includes an incorporated camera 106-1 and an incorporated display 104-1. The incorporated camera 106-1 is a camera which is included in the client system 102-1 and is able to record visual information, including visual data related to the environment in which the system is deployed and the number, location, and movement of system users, including the eye movements of system users. The camera 106-1 can be an optical camera and/or an infrared camera. The incorporated display 104-1 is also included in the client system 102-1 and displays media in the vicinity of the user.

In other implementations the client environment 108-2 includes a client system 102-2, a display 104-2, which is associated with the client system 102-2 but is not integrated into the client system 102-2, and a camera 106-2, which is associated with the client system 102-2 but is not integrated into the client system 102-2. The visual data includes data related to the environment in which the system is deployed and the positions and movement of system users, including the eye movements of system users. The camera 106-2 can be an optical camera and/or an infrared camera. The camera 106-2 is able to capture visual data of a user in the vicinity of the media being displayed on the display 104-2 associated with client system 102-2. The associated display 104-2 is configured to display media in the vicinity of the user of the client system 102-2.

In accordance with some implementations, the client system 102 receives a list of events 114 from the server system 120. The list of events 114 received from the server system includes a list of visual or auditory events which occur during a specific piece of media. In some implementations each event in the list of events include a reference time that indicates the time at which the event occurs, a duration time for the event, and, in the case of visual events, an approximate location on the display on which the event occurs. For example, a list of a events for a movie may include the following list of events: at 11 minutes and 37 seconds a loud scream occurs and lasts for 3 seconds, at 38 minutes and 27 seconds a large explosion takes place on the left half of the screen and lasts for 15 seconds, and at 61 minutes and 10 seconds a kungfu fight occurs between two characters and lasts for 2 minutes and 17 seconds.

In accordance with some implementations, the client system 102 sends the determined interest 112 to the server system 120. The determined interest represents the client systems 102 estimation, based on physical indicia, of the level of interest of a user has in the media currently or most recently displayed in the vicinity of the user. This determined interest information may be recorded in any format suitable for gauging interest. For example, the determined interest may be represented by a numerical value between 0 and 1, where 0 represents no determined interest and 1 represents full or maximum interest. Alternatively, interest may be represented by choosing one of several distinct states. For example, interest may be represented by assigning one of three possible interest values (high interest, medium interest, or low interest) to a user and reporting this value back to the server system 120. In some implementations any variation or combination of these interest scoring systems may be used.

In some implementations, the client system 102 sends the raw visual data that it captures to the server system 120. The visual data is then stored at the server system 120. The server system 120 then analyzes the stored visual data to determine interest information when needed, without having to rely on a client system 102 to perform the calculations. In other implementations, the captured visual data is transferred from several different devices (computers, TVs, DVRs, smart phones, and tablets) to a single location (like a local server) in a building or house for analysis. In this way, each device need not devote resources to analysis of captured visual data. In some implementations, one of the devices (such as a home PC) acts as a local server.

In some implementations, media content presented at the client device includes several media content items, each presented in its own window or section of the display. In this case, the client system will record data indicating which window the user is focusing on for a given period time. The client system also records the locations on the screen that each media content item is displayed so that the server system can use gaze tracking data and media content item display location data to determine on which media content item the user was focusing.

In some implementations, more than one media content item are displayed on the display in a picture-in-picture format. In other implementations, advertising content is constantly displayed in a certain portion of the screen (see for example, a banner type advertisement).

In some implementations, the presented media content includes periodic advertisements and the advertisements are included with the media content received by the client system. In other implementations, the client system 102 stores one or more advertisements and the media content transmitted to the client system 102 includes at least some pre-designated programming breaks. The client system 102 then determines an appropriate advertisement to display during the pre-designated programming breaks based on interest information gathered from the user. In some implementations, the client system 102 receives potential advertisements to display during the pre-designated programming breaks and determines whether to present the received potential advertisements or to present one of the stored advertisements based on the current users and determined interest levels.

In accordance with some implementations, the server system 120 includes a recommendation engine 122 and a media information database 130. The recommendation engine 122 is configured to collect information concerning the interests of specific users. In some implementations, this information is collected from a plurality of sources. For example, user information can be collected by aggregating user search history data, user web navigation data, user media purchases, detected user physical indicia of interest, user self-reported interest in specific media, and any other source of user interest information. Based on the collected user interest data the recommendation engine determines specific media to recommend to the user. In some implementations, the media determined by the recommendation engine 122 automatically begins displaying on the display 104 associated with the client system 102 without waiting for user selection. In other implementations, the selected media does not begin displaying until selected by a user.

In accordance with some implementations, the media information database 130 includes specific details about specific pieces of media. For example, the media information database 130 includes the genre information, cast information, director information, event information, and other information related to specific media. The server system 120 uses this information to facilitate evaluation of potential recommendations by the recommendation engine 122. The server system 120 also uses the media information database 130 to generate a list of events 114 for a specific piece of media content being displayed on a display 104 associated with a client system 102. The media content can be program content, including TV shows, movies, streaming videos, still photos, video games or web pages; or advertisements that are presented on the display 104. In some implementations, the media information database 130 can be distributed between the server 120 and the client system 102.

Figure 2A:
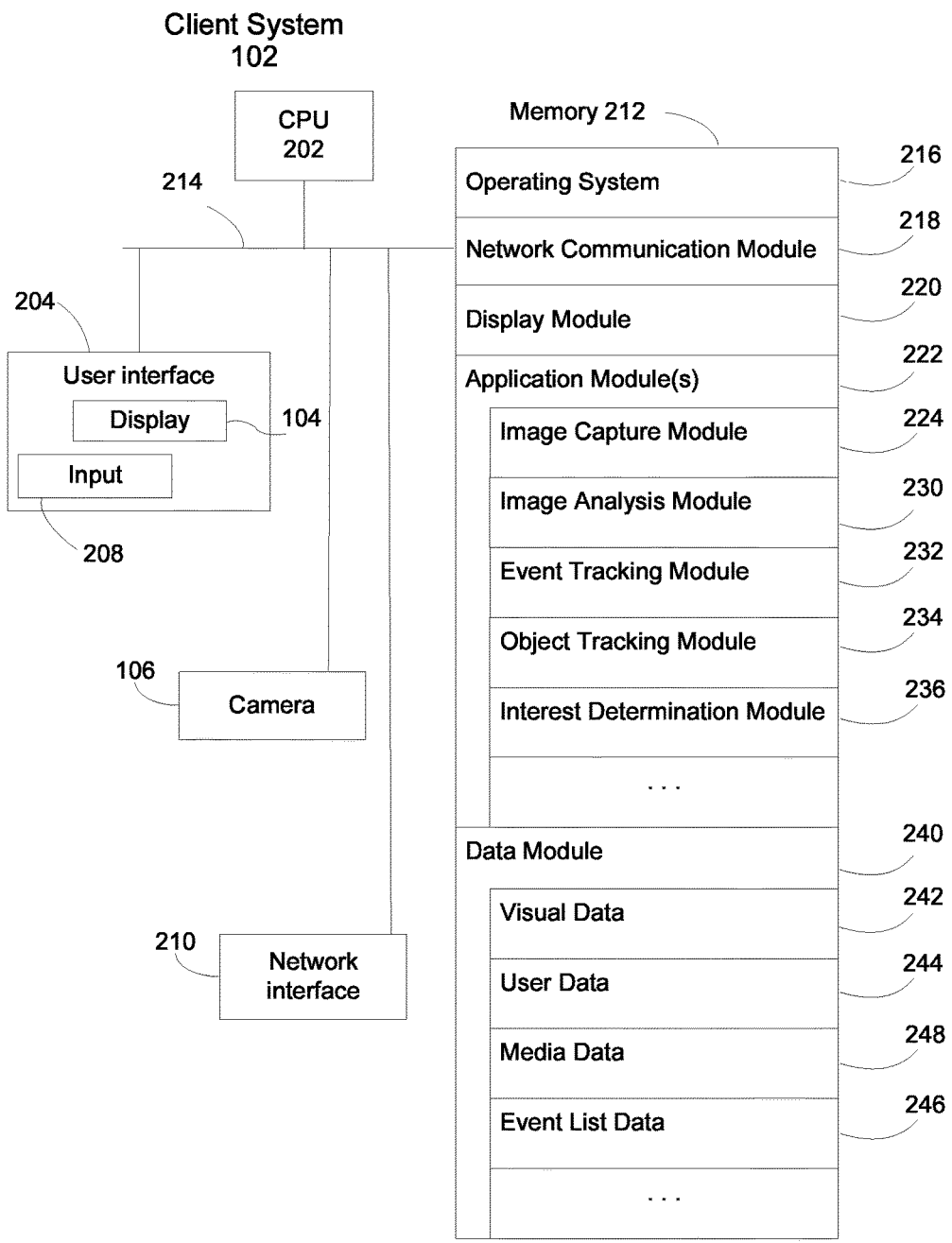
FIG. 2A is a block diagram illustrating a client system in accordance with some implementations.

FIG. 2A is a block diagram illustrating a client system 102, in accordance with some implementations. The client system 102 typically includes one or more processing units (CPU's) 202, one or more network interfaces 210, memory 212, an associated camera 106, and one or more communication buses 214 for interconnecting these components. The client system 102 includes a user interface 204. The user interface 204 includes an associated display device 104 and optionally includes an input means such as a keyboard, mouse, a touch sensitive display, or other input buttons 208. Optionally, the display device 104 includes an audio device or other information delivery device. Furthermore, some client systems use a microphone and voice recognition to supplement or replace the keyboard.

Memory 212 includes high-speed random access memory, such as DRAM, SRAM, SGRAM or other random access solid state memory devices; and may include non-volatile memory, such as one or more magnetic disk storage devices, optical storage devices, flash memory devices, holographic data storage devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

an operating system 216 that includes procedures for handling various basic system services and for performing hardware dependent tasks;

a network communication module 218 that is used for connecting the client system 102 to other computers via the one or more communication network interfaces 210 (wired or wireless) and one or more communication networks, such as the Internet, other wide area networks, local area networks, metropolitan area networks, and so on;

a display module 220 for enabling display of media on a display 104 associated with the client system 102;

one or more client system 102 applications module(s) 222 for enabling the client system 102 to perform the functions offered by the client system 102, including but not limited to:

an image capture module 224 for using the associated camera 106 to capture visual data of a user in the vicinity of the client system 102;

an image analysis module 230 for analyzing the visual data captured by the camera 106 to detect physical indicia of interest of a user in the proximity of the displayed media content, including but not limited to the position of the user's eyes, the position of the user's head, the position of the user's body, and any movements made by the user;

an event tracking module 232 for receiving a list of events from the server system (FIG. 1, 120) and comparing the detected physical indicia of interest against the list of events received from the server system (FIG. 1, 120) to more accurately gauge the interest of the user by comparing the physical reactions of a user specific events which occur during the media;

an object tracking module 234 for determining the position of specific objects on the display 104 associated with the client system 102, determining the gaze position of the user by analyzing the head and eye positions of the user, determining whether, at a first time, the gaze position of the user intersects with a determined object, determining whether, at a second time, the gaze position of the user intersects a determined object, and determining whether the gaze position of the user intersects with the same object at both the first and second times; and an interest determination module 236 for determining the interest a user in the vicinity of the client system 102 in media currently being displayed on the display 104 associated with the client system 102 by gathering visual information to determine physical indicia of interest and comparing the determined physical indicia of interest to a list of events received from the server system (FIG. 1, 120) or objects displayed on the display 104 associated with client system 102; and a data module 240 for storing data related to the client system 102, including but not limited to:

visual display data 242 including data to be displayed on the display 104 associated with the client system 102, including data necessary for media to be displayed (including advertising content that is stored locally and the displayed based on the currently viewing users), data necessary to display a user interface to allow the user to effectively control the client system 102, and any other data needed to effectively use the associated display 104;

user data 244 including information concerning users of the client system 102 such as a user profile, user preferences and interests, and other information relevant to effectively providing services to the user;

event data 246 including data received from the server system (FIG. 1, 102) that lists audio or visual events in media which is currently displayed or will be displayed in the future on the display 104 associated with the client system 102; and media data 248 including data associated with the media that is currently displayed or will be soon be displayed on the display 104 associated with the client system 102.

Figure 2B:
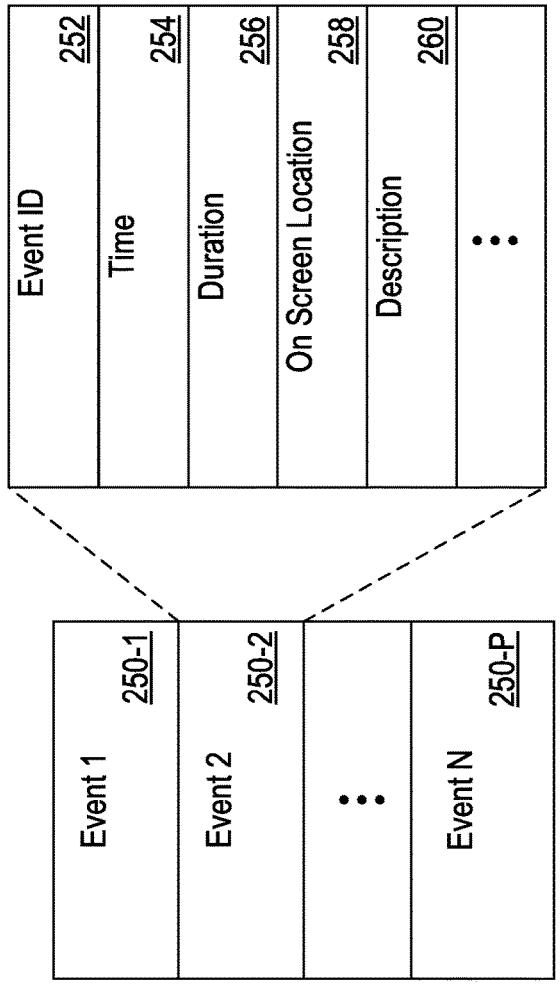
FIG. 2B is a block diagram of an event list received from a server system in accordance with some implementations.

FIG. 2B is a block diagram of an event list 246 received from a server system (FIG. 1, 12) in accordance with some implementations. Each event list includes one or more events 250. Each event represents a specific audio or visual event that occurs during the display of a specific piece of media content.

In some implementations, an event 250 includes additional information concerning the event. In some implementations each event includes one or more of: an event ID 252, a time 254, a duration 256, an on screen location 258, and additional description 260. The time 254 included in each event 250 describes at what point relative to the beginning of the piece of media the event occurs. The time data 254 allows the client system (FIG. 1, 102) to correlate specific user indicia of interest to specific events 250. In some implementations each event 250 includes a duration that describes how long the event lasts from its start time 254. For example, a scream or surprising visual would only last a few seconds at most, while a car chase or martial arts fight scene might last for a few minutes or more.

In some implementations the event data 246 further includes an on screen location 258 for visual events (such information may not be necessary for audio events). In addition, in some implementations, for audio events, surround sounds cues are monitored as sounds to the side or the rear of the screen can cause a viewer to move his or her head—obviously not in relation to content on the screen. The on screen location data includes coordinates indicating where on a display (FIG. 1, 104) the visual event 250 is being displayed. The client system (FIG. 1, 102) uses this information to determine whether the user is focusing on the displayed event 250. In some implementations the event data 246 further includes description information 260 that describes the event 250. In some implementations this information consists of a list of categories or descriptors which describe the event. For example, a car chase event might include categories such as car chase, BMW, high speed driving, vehicle stunts, and urban driving.

In some implementations the description information 260 includes a brief textual description of the event 250. For example the description may be "Police officers chase a suspect at high speeds through downtown Paris." In some implementations the client system (FIG. 1, 102) uses this description information, together with gathered physical indicia information, to analyze the interest of a user more specifically. For example, the client system (FIG. 1, 102) is able to determine if a specific type or category of event is of particular interest to a user. This interest information may then be transmitted to a server system (FIG. 1, 120).

Figure 3:
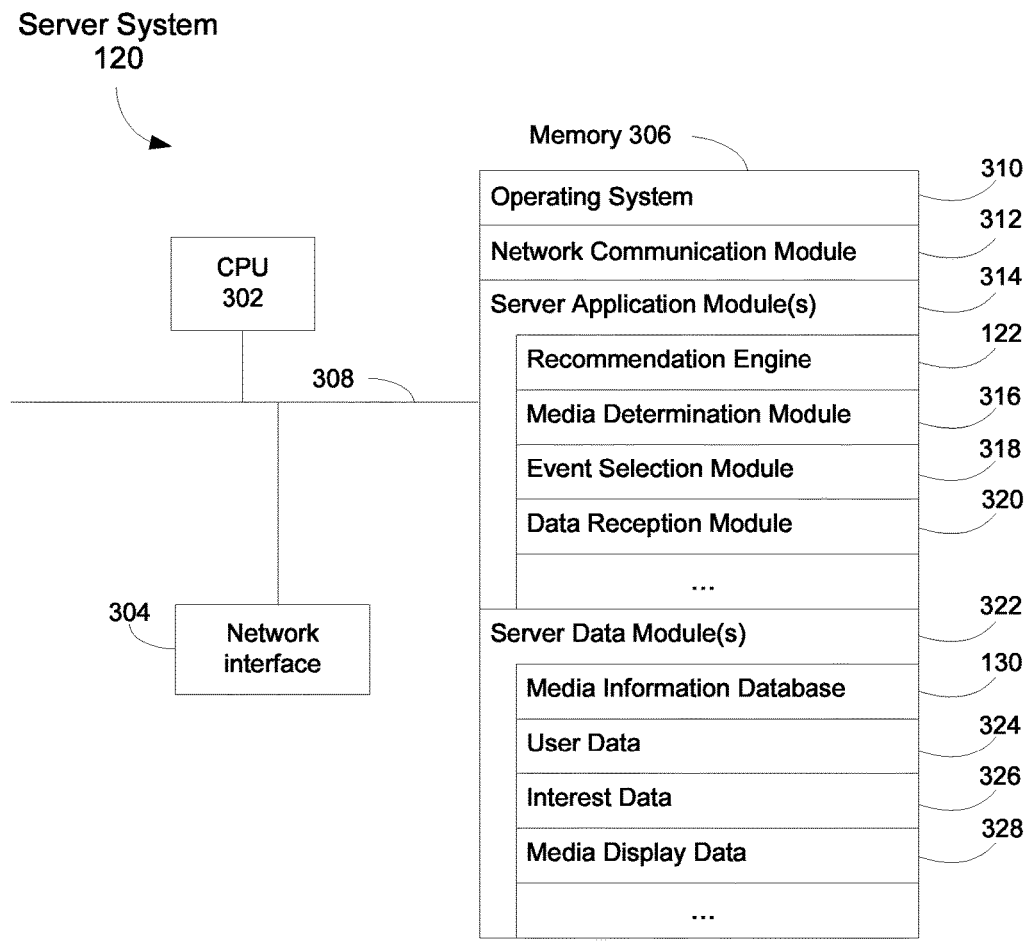
FIG. 3 is a block diagram illustrating a server system in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM, SGRAM or other random access solid state memory devices; and may include non-volatile memory, such as one or more magnetic disk storage devices, optical storage devices, flash memory devices, holographic data storage devices, or other non-volatile solid state storage devices. Memory 306 may optionally include one or more storage devices remotely located from the CPU(s) 302. Memory 306, or alternately the non-volatile memory device (s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 120 to perform the functions offered by the server system 120, including but not limited to:
  - a recommendation engine 122 for using collected user information 324 and media information database 130 to determine media of interest to a user of the client system (FIG. 2, 102) and to send a determined recommendation to the user of the client system (FIG. 2, 102);
  - a media determination module 316 for determining the media being displayed at a client system (FIG. 1, 102), wherein the media being displayed at a client system (FIG. 1, 102) is determined by receiving the identification of the media from the client system (FIG. 1, 102), analyzing the data being displayed at the display (FIG. 1, 104) associated with the client system (FIG. 1, 102), or, in the case where the media displayed at the client system (FIG. 1, 102) is being provided by the server system 120, determining the media being transmitted to the client system (FIG. 1, 102);
  - an event selection module 318 for determining a list of events to send to the client system (FIG. 1, 102) based on the media determined to be displayed on the display (FIG. 1, 104) associated with the client electronic display (FIG. 1, 102) and the information stored in the media information database 130; and
  - a data reception module 320 for receiving data from the client system (FIG. 1, 102) including interest information 326 determined by analyzing physical indicia from the user of the client system (FIG. 1, 102); and
- one or more server data module(s) 322 for storing data related to the server system 120, including but not limited to:
  - media information database 130 including specific details about particular pieces of media, including, for example, the genre information, cast information, director information, event information, and other information related to specific media;
  - user data 324 including information concerning users of the client system (FIG. 1, 102) such as a user profile, user preferences and interests, and other information relevant to effectively providing services to the user;
  - interest data 324 including data received from the client system (FIG. 1, 102) that indicates the level of interest a user has for one or more pieces of media; and
  - media display data 328 including data for, when the server system 120 provides media data to the client system (FIG. 1, 102), displaying media content on a display.

Figure 4:
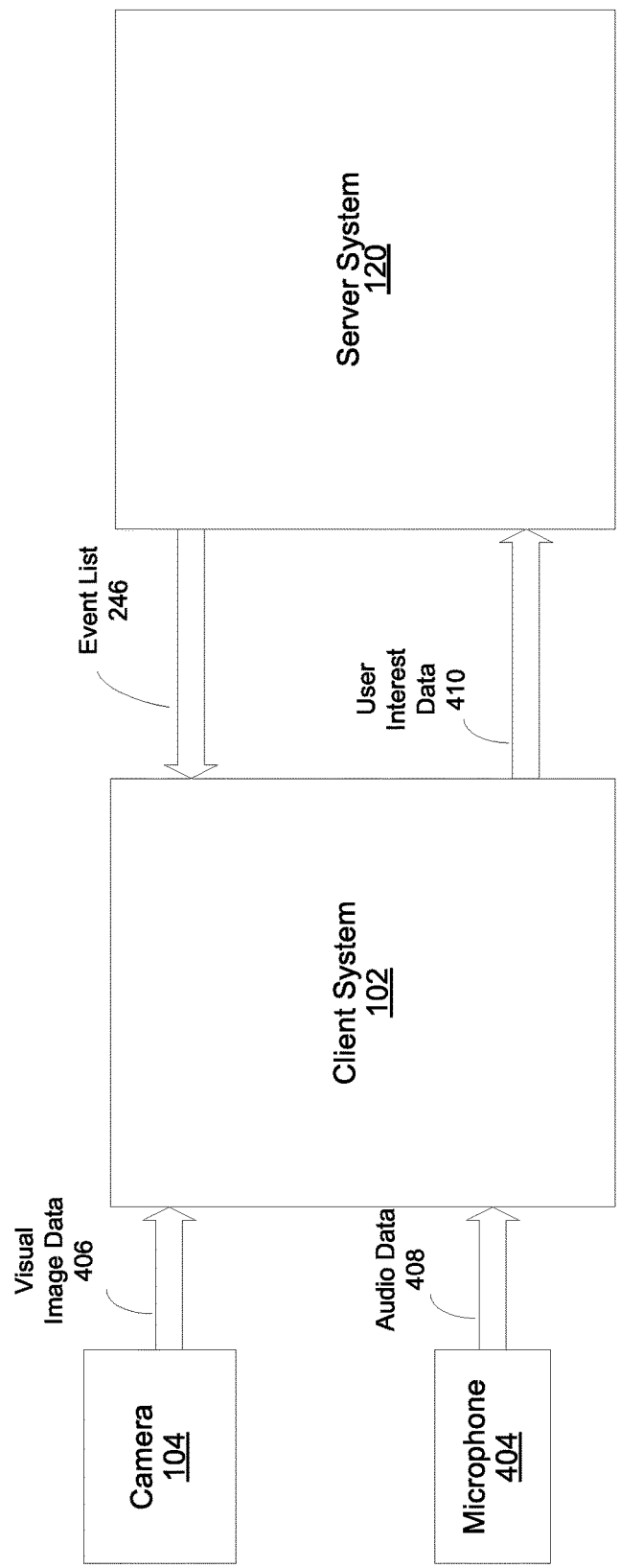
FIG. 4 is a flow diagram illustrating the process of using detected physical indicia of a user to determine the interest a user has in media being displayed on a display associated with a client system in accordance with some implementations.

FIG. 4 is a flow diagram illustrating the process of using detected physical indicia of a user to determine the interest a user has in media being displayed on a display (FIG. 1, 104) associated with a client system 102, in accordance with some implementations. It is important to note that the following process for gathering interest information of a user based on a user's physical indicia will only occur in the event that a user has explicitly consented to allow this information to be gathered. In some implementations, if the system has no information for a particular user or the user has not consented to the interest data gathering program, the client system 102 will not collect any interest information for the user and will not transmit any interest information to the server system 120. In some implementations, the client system 102, with user consent, will collect visual information necessary to identify new users to prevent double counting. For example, if a user leaves the viewing room and then later returns, the client system 102 retains enough information to identify the user as a return user, not a new user. This allows the client system to avoid double counting previously unknown users.

In some implementations, the server system 120 initially sends an event list 412 to the client system 102. The event data list 246 includes information concerning visual or auditory events which occur during a specific piece of media. In some implementations each event in the list of events includes A) a reference time that indicates the time at which the event occurs, B) a duration time for the event, and, in the case of visual events, C) an approximate location on the display on which the event occurs. For example, a list of a events for a movie may include the following list of events: at 11 minutes and 37 seconds a loud scream occurs and lasts for 3 seconds, at 38 minutes and 27 seconds a large explosion takes place on the left half of the screen and lasts for 15 seconds, and at 61 minutes and 10 seconds a kungfu fight occurs between two characters and lasts for 2 minutes and 17 seconds.

In accordance with some implementations, the client system 102 receives the list of events 412 and displays media on the display (FIG. 1, 104) associated with the client system 102. The client system 102 receives visual information data 406 from an associated camera 104. In some implementations the client environment device 102 analyzes the visual information data 406 received from the camera 104 to determine whether there are any physical indicia of interest in the visual information data 406 of the user of the client system 102.

In some implementations the client system 102 also receives audio data 408 from a microphone associated with the client system 102. This audio data can then be analyzed to determine whether there are any audio indicia of interest from a user. For example, if the list of events 412 received from the server 120 includes an event which is likely to produce an auditory reaction, such as a startling or surprising character suddenly jumping onto to the screen at a tense moment. A user who is very interested in the media currently being displayed is more likely to react audibly to startling or surprisingly scary events in the media being displayed.

In some implementations the client system 102 analyzes the data received from the camera 104 and the microphone 404 to determine physical indicia of interest. For example, by analyzing the visual data received from the camera 104 to determine the position of the user's eyes and, from that information, determining the sight lines of each eye and then determine where, relative to the display, the user's gaze is focused. Based on the determined user's gaze point the client system 102 is able to estimate a user's interest in the media currently being displayed. The client system 102 is also able to estimate interest by analyzing the position of the user's head to determine generally where the user is looking, the body lean of the user, and the user's reactions to the media currently being displayed.

In some implementations, the client system 102 uses the list of events 412 received from the server system 120 to help determine a user's level of interest. The client system 102 correlates the list of events 412 with the visual data 406 to improve the ability of the client system 102 to accurately determine the user's interest in the media currently being displayed. For example, if the list of events 412 describes a large explosion at a particular point in the media, the client system 102 can specifically see whether the user has a physical reaction to the noted explosion. A user who physically reacts to specific events will be determined to be more interested in the currently displayed media than a user who does not physically react to specific events. In some implementations, a user will be holding or carrying an electronic device that includes an accelerometer (a smart phone, for example). The smart phone can collect user motion data with the accelerometer and, with user consent, include this data with other gathered physical indicia data.

In accordance with some implementations, the client system transmits the determined user interest data 410 to the server system 120. The user interest data 410 includes a score or ranking representing the degree to which the user is interested in a particular piece of media. The user interest data 410 includes data identifying the media to which the interest score or ranking applies.

In accordance with some implementations the server system 120 receives the user interest data 410 and stores it for further use. In some implementations, the server system 120 uses this user interest data 410 as data for the recommendation engine (FIG. 1, 122) to more accurately predict additional media that would be of interest to a user. The user interest data 410 received from the client system 102 is obtained without having to require interaction from the user. In addition, physical indicia may indicate user interest in media to which a user is not aware or which a user would not volunteer to a recommendation engine if the information were not automatically collected. In some implementations, the received user interest data 410 is combined with other information the server system has collected about the user to make a more accurate determination regarding future recommendations. In some implementations the user is able to log into a service which has a user profile for the user already constructed. The user profile includes a more extensive record of the users previously indicated interests and other information relevant to making recommendations. In some implementations, the user profile information is stored either on the client, on the server, or on a combination of both the client and the server.

Figure 5A:
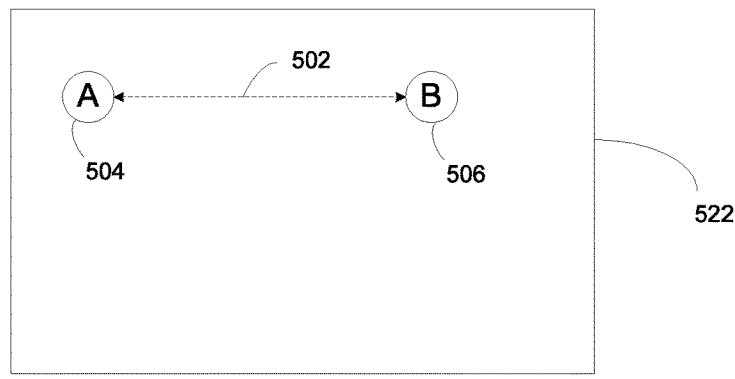
FIG. 5A depicts an example of determining user interest through physical indicia in accordance with some implementations.

FIG. 5A depicts an example of determining user interest through physical indicia, in accordance with some implementations. In this example, the client system (FIG. 1, 102) analyzes capture visual data to determine position and rotation of a user's eyes. Based on the determined position and rotation of a user's eyes, the client system (FIG. 1, 102) determine the sight line of the eye and where that sight line intersects with a display 522 that is currently displaying media. The client system (FIG. 1, 102) maps each eye independently. In accordance with some implementations the client system (FIG. 1, 102) determines where the left eye's sight line intersects the display 522 and records the left eye gaze point (A) 504. The client system (FIG. 1, 102) determines the right eye's sight line intersects the display 522 and records the right eye gaze point (B) 506.

In accordance with some implementation the client system (FIG. 1, 102) measures the distance between the left eye gaze point (A) 504 and the right eye gaze point (B) 506. The client system (FIG. 1, 102) uses the measured distance 502 between the left and right gaze points to determine where the user's focus is located. In some implementations the client system (FIG. 1, 102) determines that the user is not focused on the displayed associated with the client system (FIG. 1, 102). For example, when the measured distance 502 between the left gaze point (504) and the right gaze point (506) is greater than a predetermined value and therefore the client system (FIG. 1, 102) is able to determine the user's focus is behind the display 522. Determining that the user's focus is behind the display 522 indicates that the user does not have high interest in the currently displayed media. In some implementations, the client system (FIG. 1, 102) determines that the user's left gaze point (504) and the right gaze point (506) do not intersect with the display (FIG. 1, 104) associated with the client system (FIG. 1, 102) and thus determines that the user is not focusing on the display (FIG. 1, 104).

Figure 5B:
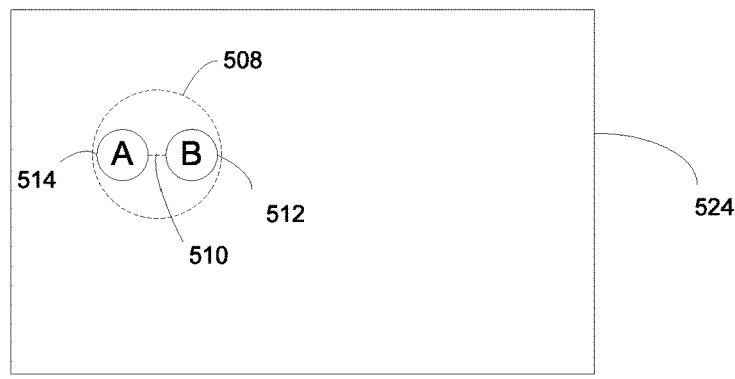
FIG. 5B depicts an example of determining user interest through physical indicia in accordance with some implementations.

FIG. 5B depicts an example of determining user interest through physical indicia, in accordance with some implementations. In this example, the client system (FIG. 1, 102) determines viewer's the left gaze point (A) 514 and the right gaze point (B) 512. In accordance with some implementations the distance between the right and left gaze points is less than a predetermined distance. When the determined distance 510 is less than a predetermined distance the client system (FIG. 1, 102) is able to determine that the user is focusing on the display 524 and to determine a focus area 508 on the display 524. The focus area 508 represents the area on the display 524 that the user is focusing on. In some implementations when the distance 510 between the left gaze point 514 and the right gaze point 512 is less than a predetermined value the client system (FIG. 1, 102) determines that the user's interest in the currently displayed media is relatively high.

Figure 5C:
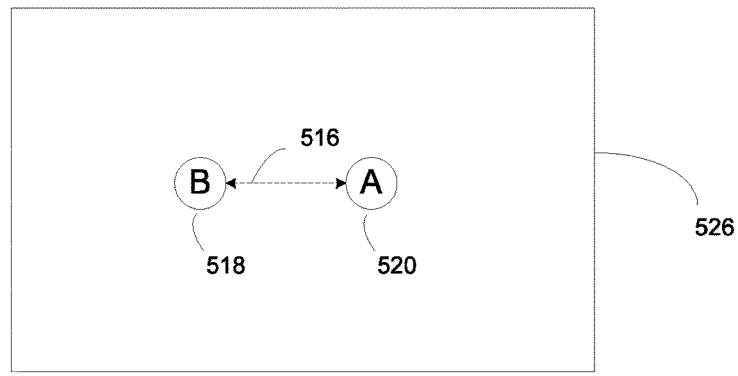
FIG. 5C depicts an example of determining user interest through physical indicia in accordance with some implementations.

FIG. 5C depicts an example of determining user interest through physical indicia, in accordance with some implementations. In this example, the client system (FIG. 1, 102) determines the left gaze point (A) 520 and the right gaze point (B) 518. In some implementations the left gaze point (A) 520 is on the right side of the right gaze point (B) 518. In this case, the client system (FIG. 1, 102) can determine that user's focus is on something in front of the screen, regardless of the distance between 516 the left gaze point 520 and the right gaze point 518. Based on this determination, the client system (FIG. 1, 102) determines that the user has relatively low interest in the currently displayed media.

In some implementations more than one user is in the vicinity of the client system (FIG. 1, 102) which is displaying media content on its associated display. In some implementations, the client system (FIG. 1, 102) will have associated profiles with each user and will measure their interest individually. This is accomplished by identifying each user (assuming each user has consented), via facial recognition for example, and then tracking each individual's physical indicia of interest. In other implementations, the client system (FIG. 1, 102) does not have associated profiles associated with all the users. In this circumstance the client system (FIG. 1, 102) will determine or select the primary user of the client system (FIG. 1, 102) and determine the primary user's interest. The primary user may be identified by facial recognition, voice print, proximity to the client system (FIG. 1, 102), or proximity to a remote control associated with the client system (FIG. 1, 102).

In some implementations, the client system (FIG. 1, 102) does not have individual profiles for each user and cannot or has not identified a primary user. In these circumstances the client system (FIG. 1, 102) tracks the interest level for all available users and then compares the levels of interest. In accordance with a determination that all available users have comparable levels of interest, the interest levels are averaged together. In accordance with a determination that all the available users have sufficiently different levels of interest, such that no real consensus is reached, the various different levels of interest either sent individually to the server system or the divergent interests are all discarded and no level of interest is sent to the server system (FIG. 1, 120).

Figure 6A:
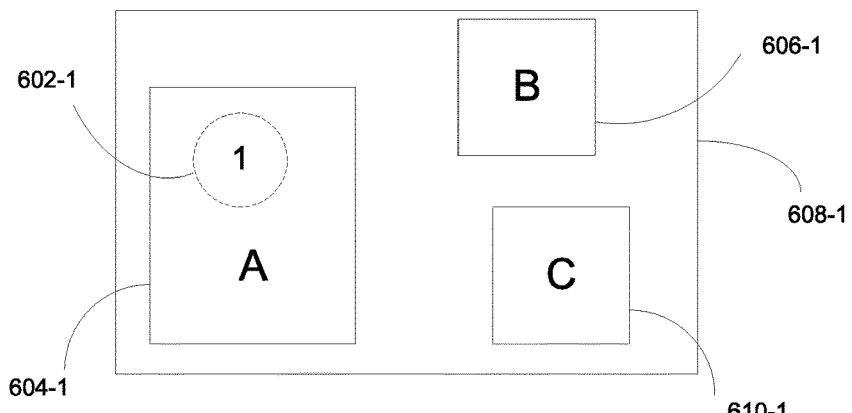
FIG. 6A depicts an example of determining user interest through tracking displayed objects and determining the user focus area in accordance with some implementations.

FIG. 6A depicts an example of determining user interest through tracking displayed objects and determining the user focus area at a first point in time, in accordance with some implementations. In this example, the client system (FIG. 1, 102) determines a list of objects that are currently displayed on the display 610-1 (objects A 604-1, B 606-1, and C 610-1). The client system (FIG. 1, 102) tracks the position of each object on the display 608-1 and determines the focus area 602-1 of a user at multiple different times. By tracking the movement of objects on the display 608-1 through time and also tracking the user's focus area through time, the client system (FIG. 1, 102) can determine whether the user's focus area is following a specific object. In some implementations determining that the user's focus area 602-1 is following a specific object through different times, indicates that the user's interest in the media is high.

In accordance with some implementations, the client system (FIG. 1, 102) determines the focus area 602-1 of the user. The client system (FIG. 1, 102) then determines whether the focus area 602-1 intersects with any of the objects currently displayed on the display 608-1. In this example, the client system (FIG. 1, 102) intersects with object A 604-1. The client system (FIG. 1, 102) stores this information for future use.

Figure 6B:
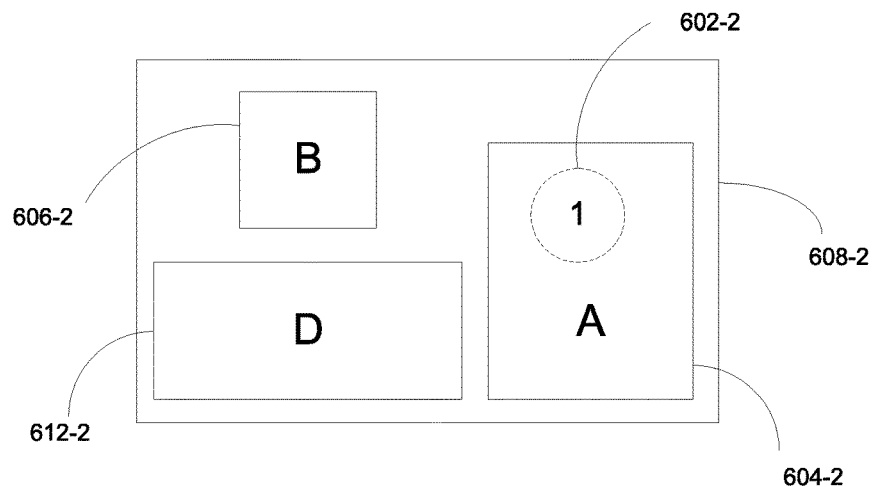
FIG. 6B depicts an example of determining user interest through tracking displayed objects and determining the user focus area in accordance with some implementations.

FIG. 6B depicts an example of determining user interest through tracking displayed objects and determining the user focus area at a second point in time, in accordance with some implementations. In this example, the objects are the same as those depicted in FIG. 1, but have moved between the first time and the second time. The client system (FIG. 1, 102) determines the positions of the objects on the display 608-2 and the user's focus area 602-2 at a second time. As can be seen, relative to the display at time one in FIG. 6A, object A 604-2 and object B 606-2 have moved position on the display and object C 610-1 has left the display 608-2 has left the display entirely. Further, object D 612-2 has entered the display 608-2. The client system (FIG. 1, 102) determines the position of the user focus area 602-2. In this example the user focus area has moved relative to its position at the first time as seen in FIG. 6A.

In accordance with some implementations, the client system (FIG. 1, 102) determines the position of the user focus area 602-2 and whether it intersects with any objects currently displayed. In this example the user's focus area 602-2 intersects with object A. In some implementations the client system (FIG. 1, 102) compares the focus area intersect data from the first time with the focus area intersect data from the second time to determine whether the user's focus area 602-2 has followed a specific object from the first time to the second time. In this example, the user's focus area 602-2 intersects with object A at both the first and the second time. In some implementations, the client system (FIG. 1, 102) determines that the user's interest in the displayed media is relatively high based on determining that the user's focus area has followed a specific object from the first time to the second time.

Figure 6C:
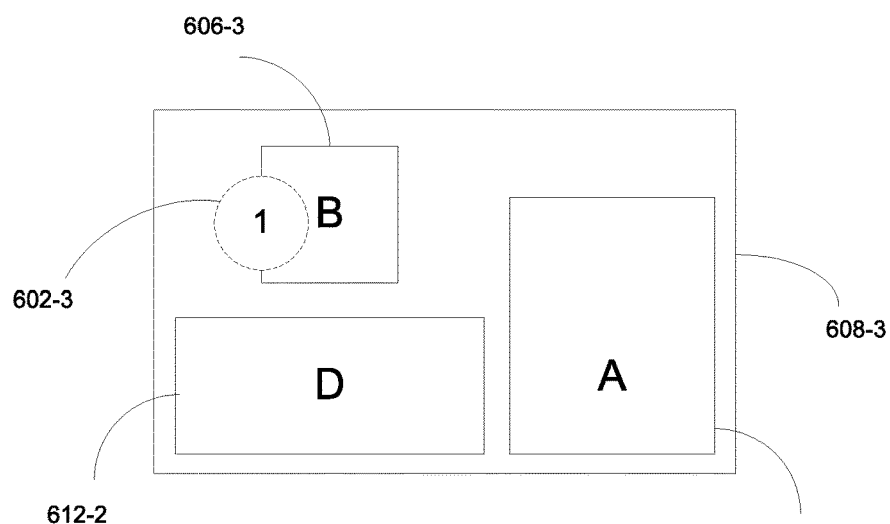
FIG. 6C depicts an example of determining user interest through tracking displayed objects and determining the user focus area in accordance with some implementations.

FIG. 6C depicts an example of determining user interest through tracking displayed objects and determining the user focus area at a third point in time, in accordance with some implementations. In this example, the objects are the same as those depicted in FIG. 1 but the objects have moved between the first time and the third time. The client system (FIG. 1, 102) determines the position of objects on the display 608-3 and the position of the user focus area 602-3. In this example the objects A 604-3 and B 606-3 have moved from the original positions from the first time as depicted in FIG. 6A. Object C 610-1 has left the display 608-3 and object D 612-2 has entered the display 608-3. In contrast to the example depicted in FIG. 6B, the user's focus area 602-3 has not moved relative to its position at the first time depicted in FIG. 6A. Thus, the user's focus point has not moved from the first time to the second time. In some implementations, the client system (FIG. 1, 120) determines that the user interest in the displayed media is relatively low based on the fact that the user's focus area has not changed despite movement of the displayed objects.

Figure 7:
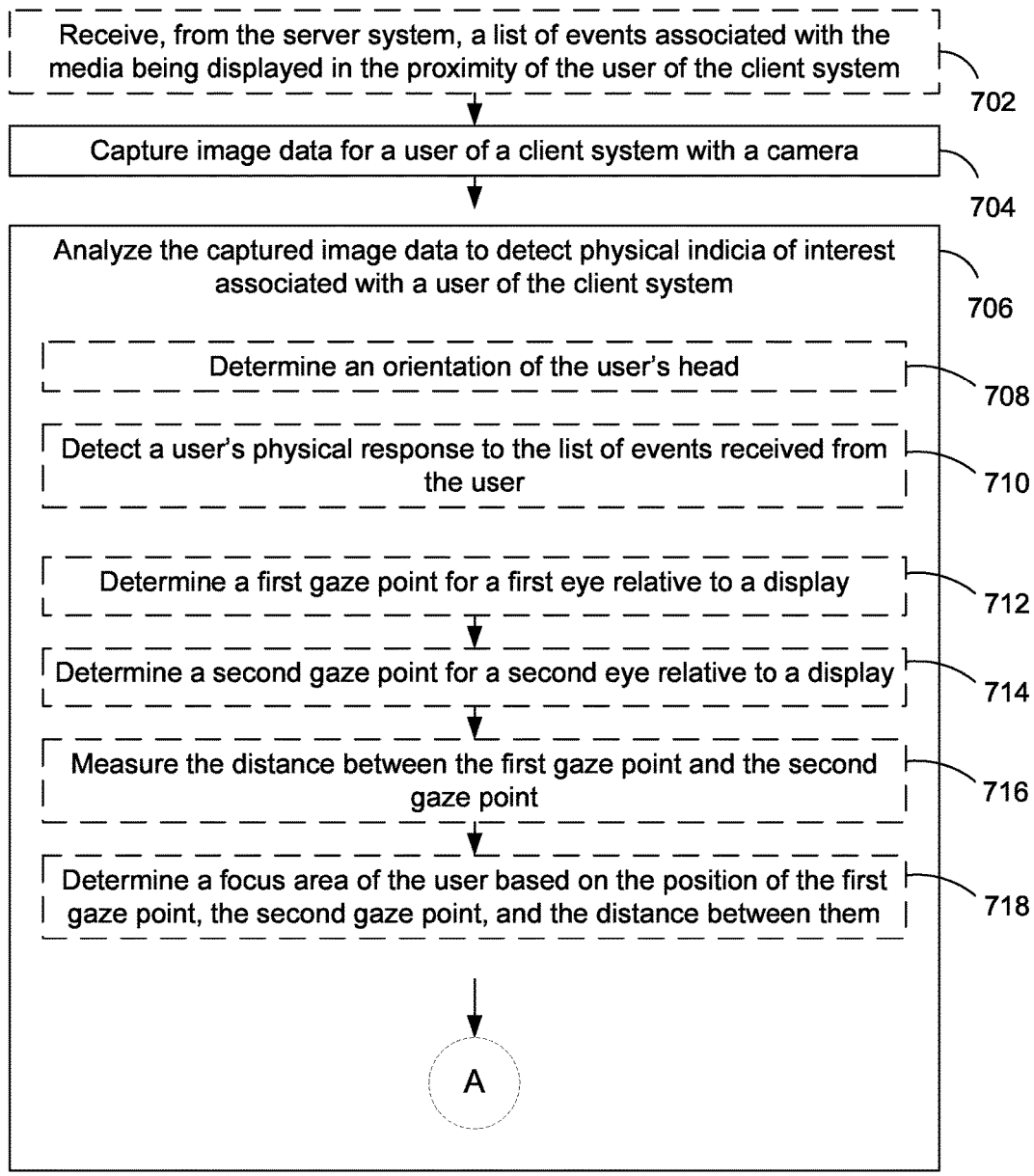
FIG. 7 is a flow diagram illustrating the process of detecting user interest based on physical indicia in accordance with some implementations.

FIG. 7 is a flow diagram illustrating the process of detecting user interest based on physical indicia, in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the client system (FIG. 1, 102).

In accordance with some implementations, the client system (FIG. 1, 102) receives, from the server system (FIG. 1, 120), a list of events (FIG. 2, 246) associated with the media being displayed in the proximity of the user of the client system (702). In some implementations, a camera (FIG. 1, 106) captures visual data of a user of a client system (FIG. 1, 102) and transmits the visual data to the client system (FIG. 1, 102). In some implementations, the client system (FIG. 1, 102) analyzes the captured visual data to detect physical indicia of interest associated with a user of the client system (706). In some implementations, analyzing the capture visual data includes determining an orientation of the user's head (708). In some implementations analyzing the captured visual data includes detecting a user's physical response to the list of events received from the user (710).

In accordance with some implementations, the client system (FIG. 1, 102) analyzing the captured visual data includes determining a first gaze point for a first eye relative to a display (712). The client system (FIG. 1, 102) further determines a second gaze point for a second eye relative to a display (714). The client system (FIG. 1, 102) further measures the distance between the first gaze point and the second gaze point (716). The client system (FIG. 1, 102) further determines a focus area of the user based on the position of the firsts gaze point, the second gaze point, and the distance between them (718).

Figure 8:
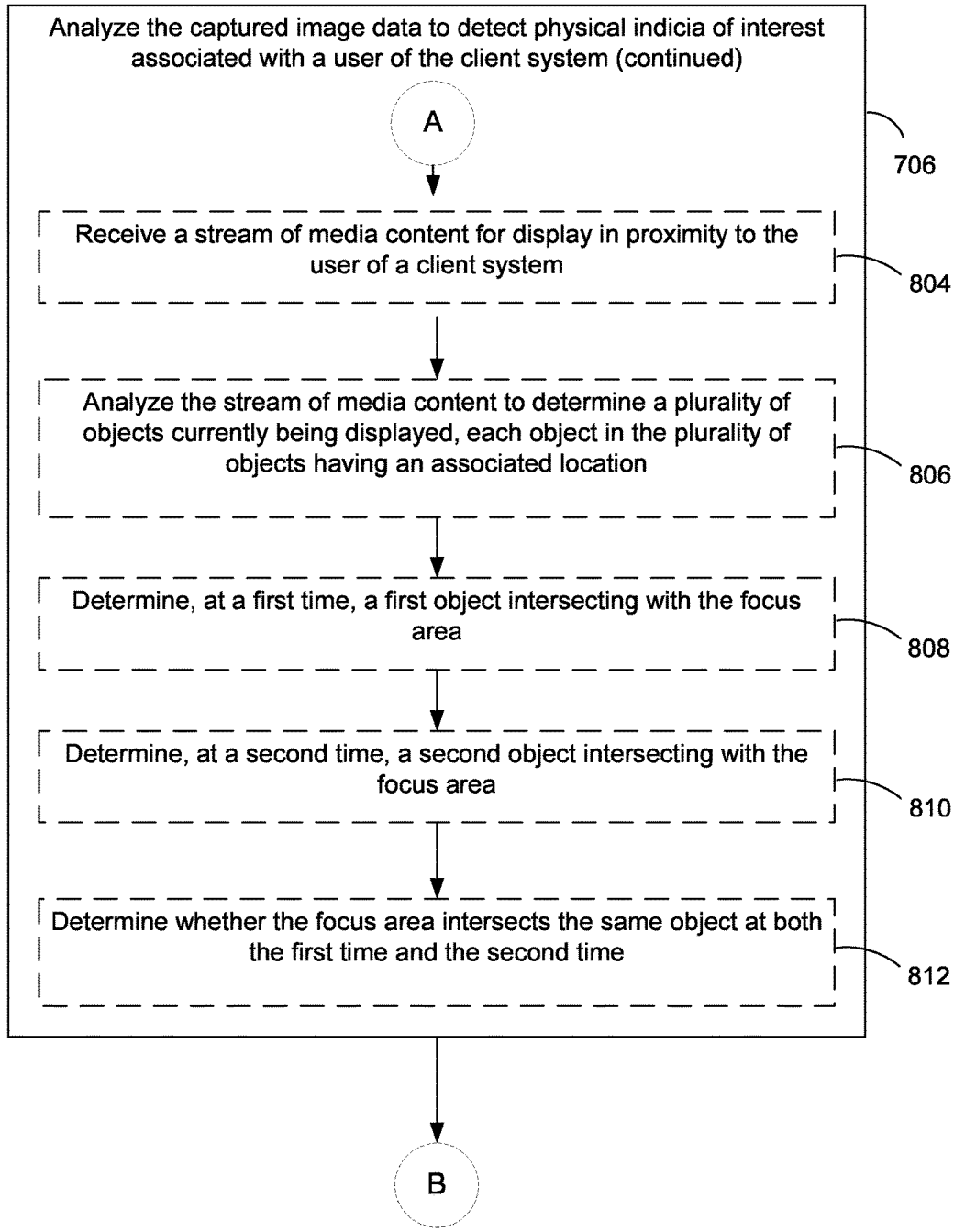
FIG. 8 is a flow diagram illustrating the process of detecting user interest based on physical indicia in accordance with some implementations.

FIG. 8 is a flow diagram illustrating the process of detecting user interest based on physical indicia, in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the client system (FIG. 1, 102).

In accordance with some implementations, the client system (FIG. 1, 102) analyzing the captured visual data includes receiving a stream of media content for display in proximity to the user of a client system (804). The client system (FIG. 1, 102) further analyzes the stream of media content to determine a plurality of objects currently being displayed, each object in the plurality of objects having an associated (806). The client system (FIG. 1, 102) further determines, at a first time, a first object intersecting with the user's focus area (808). The client system (FIG. 1, 102) further determines, at a second time, a second object intersecting with the user's focus area (810). The client system (FIG. 1, 102) further includes determining whether the focus area intersects the same object at both the first time and the second time (812).

For example, the client system (FIG. 1, 102) identifies three objects on a screen, a main character, a vehicle, and a chandelier. The client system (FIG. 1, 102) tracks the location of each object while the media is being displayed. The client system (FIG. 1, 102) also tracks the visual focus area of the user. So, if the client system (FIG. 1, 102) determines that, at a first time, the user's focus area intersects with the main character object, the client system (FIG. 1, 102) and at a second time, the user's focus area still intersects with the main character object despite the object having moved, the client system (FIG. 1, 102) determines that the user's interest level in this media is relatively high. Conversely if the user's focus area remains unchanged despite the displayed objects changing position, this indicates that the user's interest level is relatively low.

Figure 9:
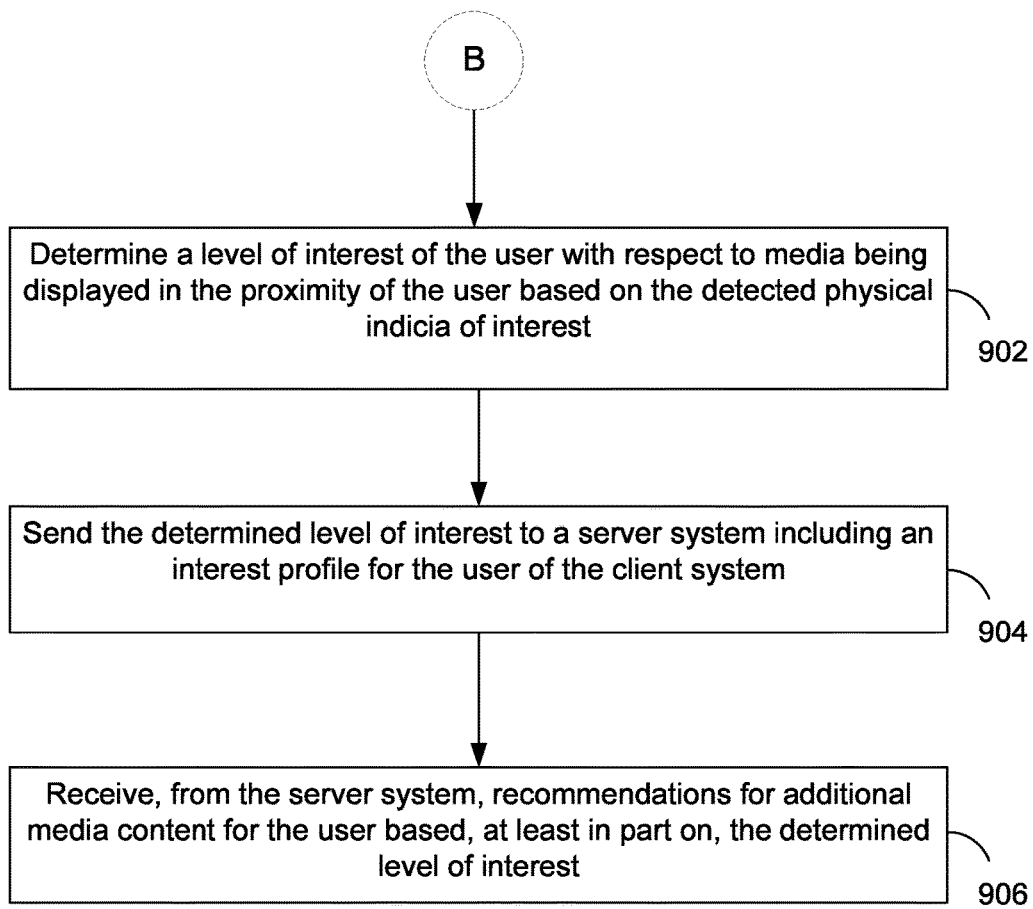
FIG. 9 is a flow diagram illustrating the process of detecting user interest based on physical indicia in accordance with some implementations.

FIG. 9 is a flow diagram illustrating the process of detecting user interest based on physical indicia, in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the client system (FIG. 1, 102).

In accordance with some implementations, the client system (FIG. 1, 102) determines a level of interest of the user with respect to media being displayed in the proximity of a user based on the detected physical indicia of interest (902). The client system (FIG. 1, 102) sends the determined level of interest to a server system (FIG. 1, 120) including an interest profile for the user of the client system (904). The client system (FIG. 1, 102) receives, from the server system (FIG. 1, 120), recommendations for additional media content for the user based, at least in part on, the determined level of interest (906).

Using Facial Recognition to Monitor Audience Attendance

In some implementations, a user of a client system is enrolled in a study to measure viewership of media content. A media viewership study tracks the media content viewership habits of a group of users (sometimes referred to as a panel), each of whom has volunteered to participate in the panel. A panel member is notified of and provides consent for each aspect of their viewership habits that will be tracked prior to such information being collected and analyzed. In addition, in some implementations, raw information collected from participants is not reported directly to panel sponsors (such advertisers or broadcasters), but is anonymized and commonly aggregated so it cannot be used to identify particular users/panelists. Also note, in general during this application, recognizing a face refers to the process of determining that an object in the visual data is a face and comparing the measureable attributes of a face to a list of stored faces. Identifying generally refers to the process of associating a recognized face with an identity such as a user account or a user record. However, these terms may occasionally be used interchangeably and may refer to the entire process of determining an object is a face and associating it with a particular user profile or identity.

In some implementations, based on the data gathered about a user's viewing habits, the data can be extrapolated to generate estimates of total viewers for a plurality of pieces of media content and to determine popularity of such media content, or even segments of such media content. Previous methods of tracking media content viewership habits rely on users to manually record their viewership habits, either by manually recording their viewing or by logging into a system to record their viewing habits. In either case the process can be tedious and miss important information due to the limits of the technology or user error. Using facial recognition to automatically recognize a user and track their viewership habits in accordance with some implementations allows a more accurate and detailed representation of user viewing habits.

In some implementations, the client system includes a camera. The camera is used to gather visual data of one or more users in the vicinity of the system that is presenting media content. For example, the camera can capture visual data of two users watching a television or a single user sitting in front of a computer screen. The client system then analyzes this visual data to extract one or more facial images of the one or more users. A facial image is a visual image that depicts at least the face of a user. In some implementations the client system analyzes each extracted facial image of the one or more facial images to determine whether the user corresponding to the facial image is enrolled in the user viewership study. To support this analysis, the client system maintains a database of facial recognition information for at least some of the users enrolled in the viewership study. In some implementations, users submit this facial recognition information for use by the system. In some implementations, the system gathers the information from the users when the users agree to participate in the viewership study via an associated camera. In some implementations, the local (i.e., client system) camera captures facial images of viewers and securely transmits the facial images to a server computer, which attempts to identify the viewers using a database of facial recognition information that is stored on or otherwise accessible to the server. As with images captured by the client system, as described below the captured image data is deleted after use (e.g., to identify viewers) and is not stored on the server.

In some implementations, if the client system determines that a facial image in the one or more facial images matches a user enrolled in the user viewership studies, the system registers the user as currently viewing media content. In some implementations the client system automatically logs the user into the system for recording media viewership and automatically records the date and time information and identity of the media content item displayed, viewed, or presented. In some implementations the system records the date and time information and identity of the media content presented without logging the user into any program. For example, if the study includes media viewership logging software to record the media viewership, the client system will automatically log the detected user in (if necessary) and record the appropriate information.

In some implementations, in accordance with a determination that the respective user is a participant in the media viewership study, the client system determines the identity of media content being presented in the proximity of the identified user. In some implementations, the client system (FIG. 10, 1002) determines the identity of the piece of media content by sending the time, location, and channel information for the media content being presented to a server system with a media content database and receiving the identity of the media content in return. In some implementations, the client system determines the identity of the piece of media content by examining the metadata transmitted with the media content, which contains the media identify. In some implementations the client system generates one or more audio or video fingerprints of the media content and then sends those fingerprints to the server system, which then matches the audio or video fingerprints to fingerprints of known content to determine up the identity of the content.

In some implementations, in accordance with a determination that a respective facial image does not match any of the users enrolled in the user viewership study, the system still counts and records the presence of these additional viewers. In some implementations, the client system temporarily retains the facial image for any unknown users to be able to later identify the same guest and prevent redundant counts. For example, the client system periodically captures facial images for one or more users. When the system identifies a user who is not enrolled in the user viewership study the system includes this user in the total count statistics. The system retains the facial image for the non-enrolled user. The system then compares future identified non-enrolled users to the retained facial images. In this way, the system avoids double counting an unknown user. However, the system only retains this facial information for a predetermined amount of time. For example, the retained facial images may be removed from the system at the end of each piece of media content.

In some implementations, the client system captures visual data of users periodically to determine whether the user or group of users is still in the proximity of presentation of media content. For example, the client system may capture visual data every 15 seconds to determine which, if any, of the users are still in the vicinity of the device that is presenting a specific television program or commercial. In some implementations the client system can estimate interest in specific content by tracking when users begin and finish viewing media content. In this way, the system can provide granular information as to viewership during the course of different media content.

In some implementations the camera associated with the client system is infra-red sensitive, and thus is able to gather visual data even in a dimly lit or dark room. This is advantageous because media is frequently presented in less than ideal lighting conditions. For example, frequently movies are viewed in dark or dimly lit conditions and as such, cameras that are not infra-red sensitive may have trouble capturing high quality visual information for accurate facial recognition.

In some implementations, the client system only retains captured visual information for a predetermined amount of time. Many client systems are located in private homes and as such, the client system will not transfer any captured visual data outside of the client system without the consent of all relevant users. For example, if visual data of a family in a living room is captured, that visual data will be analyzed to identify all the users in the data. However, after a predetermined time period (e.g., 4 hours), the client system will then delete the data and thus prevent any privacy violations. In some implementations the predetermined time is set by the users themselves.

In some implementations, the client system 1002 removes personally identifiable information from the media viewership data. In general, personally identifiable information is only retained if the user explicitly authorizes the system to track that information and only for the specific information the user authorizes the system to remember. For example, the user may authorize the system to retain the user's email information, but not any other personally identifiable information.

In some implementations, personally identifiable information includes, but is not limited to, names, addresses, birthdays, government issued ID numbers (such as a social security number or driver's license number), IP address, e-mail address, or social network account information. Personally identifiable information further includes any information that can be used to identify a specific user from the set of all users enrolled in the media viewership study. However, the transmitted media viewership data (e.g., the media viewership data 1012 shown in FIG. 10) includes non-personally identifiable demographic information. For example, the transmitted media viewership data 1012 includes the identity of the media content presented, the number of users, approximate age, sex, and approximate location of the users, including any times when a user arrived or departed during a particular piece of media content.

In some implementations, the viewership data is transmitted to a server to be aggregated with viewership data from a plurality of other users and clients systems.

Figure 10:
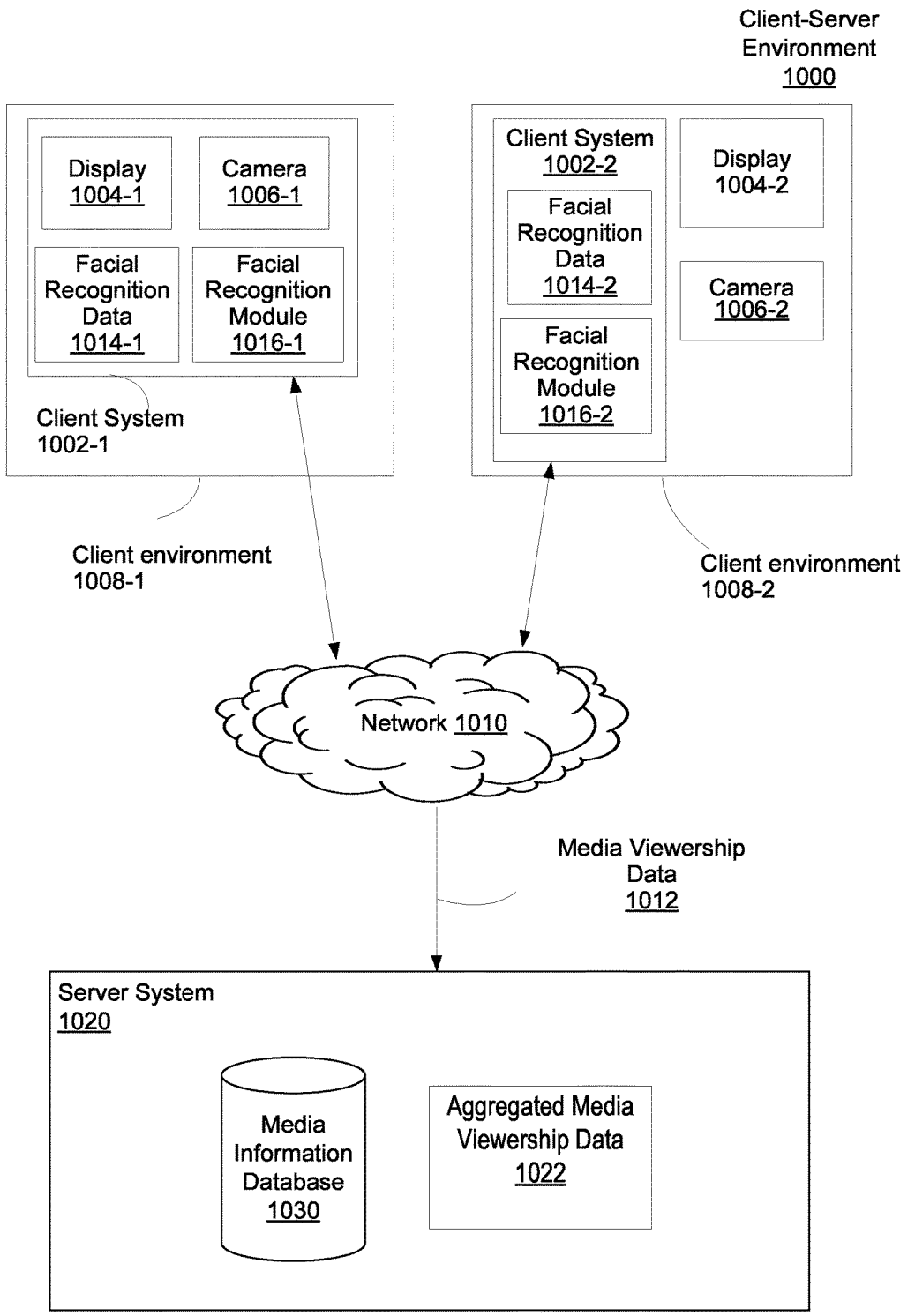
FIG. 10 is a block diagram illustrating a client/server environment including a client system with a display in accordance with some implementations.

FIG. 10 is a block diagram illustrating a client-server environment 1000, in accordance with some implementations. The client-server environment 1000 includes one or more client systems 1002, corresponding client environments 1008, and a server system 1020. In some implementations, an integrated client system 1002-1 includes a display 1004-1, a camera 1006-1, facial recognition data 1014-1, and a facial recognition module 1016-1. In some implementations, the integrated client system 1002-1 is a connected TV, an all-in-one desktop computer system, a laptop or tablet computer, a smart phone, or a handheld gaming system.

The incorporated camera 1006-1 is a camera that is included in the client system 1002-1 and is able to record visual information. In some implementations the camera is an infra-red sensitive camera that is able to gather visual information accurately even in poorly lit or dark environments. The incorporated display 1004-1 is also included in the client system 1002-1 and presents media in the vicinity of the user.

In some implementations, facial recognition data 1014-1 includes sufficient data to use facial recognition to automatically identify users enrolled in a media content viewership study. This facial recognition data 1014-1 includes detailed information concerning the attributes of the faces of users enrolled in the study. In some implementations the facial recognition data 1014-1 is submitted by enrolled users or gathered by the system, through associated cameras.

In some implementations, a facial recognition module 1016-1 includes software configured to extract facial images from visual data and then perform facial recognition algorithms to match facial images against the facial recognition data 1014-1 stored at the client system 1002-1. For example, if two users are identified in the captured visual data, the facial recognition module 1016-1 extracts a facial image for each user and compares the features found in the facial images to the data stored in the facial recognition database 1014-1. If the user is enrolled in a viewership study for which the system is configured to function, the client system 1002-1 will determine a match. In some implementations where facial recognition is performed at the server system 1020, the facial recognition data 1014-1 and the facial recognition module 1016-1 are also provided at the server, and the same elements may or may not be provided at the client system 1002-1.

In some implementations the client environment 1008-2 includes a client system 1002-2, a display 1004-2 that is associated with the client system 1002-2 but is not integrated into the client system 1002-2, and a camera 1006-2 that is associated with the client system 1002-2 but is not integrated into the client system 1002-2. The camera 1006-2 is able to capture visual data of a user in the vicinity of the media being presented on the display 1004-2 associated with client system 1002-2. The associated display 1004-2 is configured to present media in the vicinity of the user of the client system 1002-2. The client system 1002-2 includes facial recognition data 1014-2 and a facial recognition module 1016-2. In some implementations, the client system 1002-2 is a connected TV, a desktop computer system, a gaming console, or a programmable set top box, such as a smart TV enabled device.

In accordance with some implementations, the client system 1002 periodically gathers visual information using the camera 1006-1 from the audience area of the client system 1002-1. The facial recognition module 1016-1 extracts facial images for the one or more users in the visual information. The visual information is discarded after the facial images are extracted. In this way, image data collected from private client environments 1008-1 is never transmitted to a server 1020 or otherwise shared with anyone outside of the client system 1002-1 itself. Alternatively, in some implementations where facial recognition is performed at the server, the image data is securely transferred to the server system 1020 from a client environment 1008, after performing facial recognition, the server discards the image data.

In some embodiments, the facial recognition module 1016-1 uses a facial recognition algorithm to compare the extracted facial images to stored facial recognition data 1014-1. For each extracted facial image, the facial recognition module 1016-1 determines if the facial image matches the stored facial recognition data 1014-1. In accordance with a determination that a facial image matches the stored facial recognition data 1014-1, the client system 1002-1 records the media viewership data 1012. In some implementations, the recorded media viewership data is sent to the server 1020 for aggregation with the data from other participants in the media viewership study.

In accordance with some implementations, the server system 1020 includes aggregated media viewership data 1022 and a media information database 1030. The aggregated media viewership data 1022 is collected from a plurality of clients systems 1002-1 used by users enrolled in a media viewership study. In some implementations the aggregated media viewership data 1022 contains no personally identifiable information. For example, the aggregated media viewership data 1022 includes data representing the viewing habits (including specific pieces of media content) of 500 users enrolled in a specific media viewership study. This information is organized by demographic categories and used to estimate viewership totals for particular pieces of media content.

In accordance with some implementations, the media information database 1030 includes specific details about specific pieces of media. For example, the media information database 1030 includes the genre information, cast information, director information, event information, and other information related to specific media. In some implementations, the server system 1020 uses this information to respond to requests from the client system to identify a specific piece of media content currently being presented. For example, if the client system 1002-1 is currently presenting media content from Channel 6 in Houston, Tex., the client system 1002-1 can query the media information database 130 to determine the specific piece of media content currently being presented.

Figure 11:
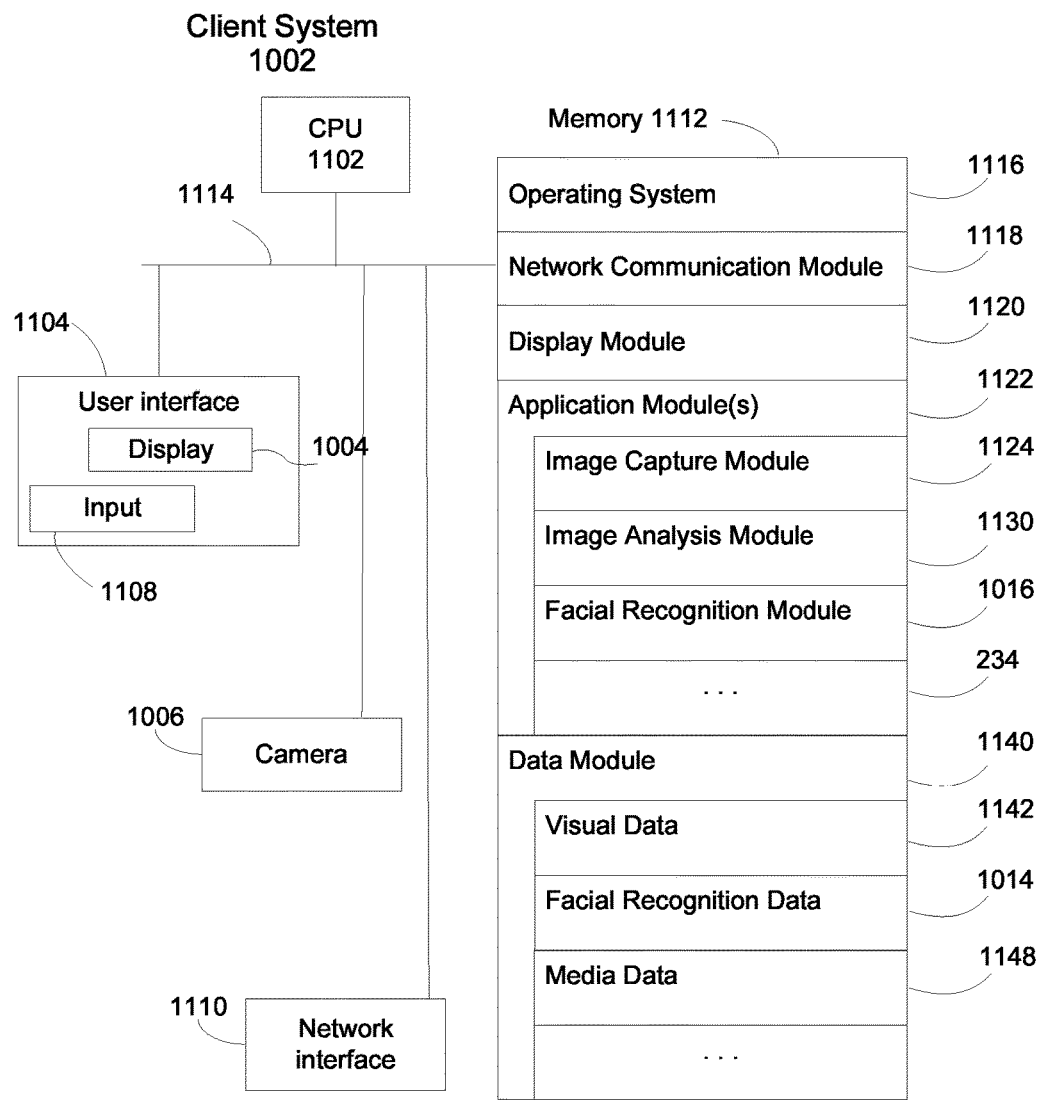
FIG. 11 is a block diagram illustrating a client system in accordance with some implementations.

FIG. 11 is a block diagram illustrating a client system 1002, in accordance with some implementations. The client system 1002 typically includes one or more processing units (CPU's) 1102, one or more network interfaces 1110, memory 1112, an associated camera 1006, and one or more communication buses 1114 for interconnecting these components. The client system 102 includes a user interface 1104. The user interface 1104 includes an associated display device 1004 and optionally includes an input means such as a keyboard, mouse, a touch sensitive display, or other input buttons 1108. Optionally, the display device 1004 includes an audio device or other information delivery device. Furthermore, some client systems use a microphone and voice recognition to supplement or replace the keyboard.

Memory 1112 includes high-speed random access memory, such as DRAM, SRAM, SGRAM or other random access solid state memory devices; and may include non-volatile memory, such as one or more magnetic disk storage devices, optical storage devices, flash memory devices, holographic data storage devices, or other non-volatile solid state storage devices. Memory 1112 may optionally include one or more storage devices remotely located from the CPU(s) 1102. Memory 1112, or alternately the non-volatile memory device(s) within memory 1112, includes a non-transitory computer readable storage medium. In some implementations, memory 1112 or the computer readable storage medium of memory 1112 stores the following programs, modules and data structures, or a subset thereof:

- an operating system 1116 that includes procedures for handling various basic system services and for performing hardware dependent tasks;
- a network communication module 1118 that is used for connecting the client system 1002 to other computers via the one or more communication network interfaces 1110 (wired or wireless) and one or more communication networks, such as the Internet, other wide area networks, local area networks, metropolitan area networks, and so on;
- a display module 1120 for enabling presentation of media content on a display 1004 associated with the client system 1002;

one or more client system 1002 applications module(s) 1122 for enabling the client system 1002 to perform the functions offered by the client system 1002, including but not limited to:

an image capture module 1124 for using the associated camera 106 to capture visual data of a user in the vicinity of the client system 1002;

an image analysis module 1130 for analyzing the visual data captured by the camera 1006 to extract facial images of the one or more users in the audience area of the device or, in other words, in proximity to the device presenting the media content;

a facial recognition module 1016 for analyzing facial images to determine whether the users represented in the facial images are enrolled in a given viewership measurement study; and a data module 1140 for storing data related to the client system 1002, including but not limited to:

visual display data 1142 including data to be presented on the display 1004 associated with the client system 1002, including data necessary for media to be presented, data necessary to display a user interface to allow the user to effectively control the client system 1002, and any other data needed to effectively use the associated display 1004;

facial recognition data 1014 including information needed to perform a facial recognition algorithm on the facial images captured by the camera; and media data 1148 including data associated with the media that is currently presented or will be soon be presented on the display 1004 associated with the client system 1002.

Figure 12:
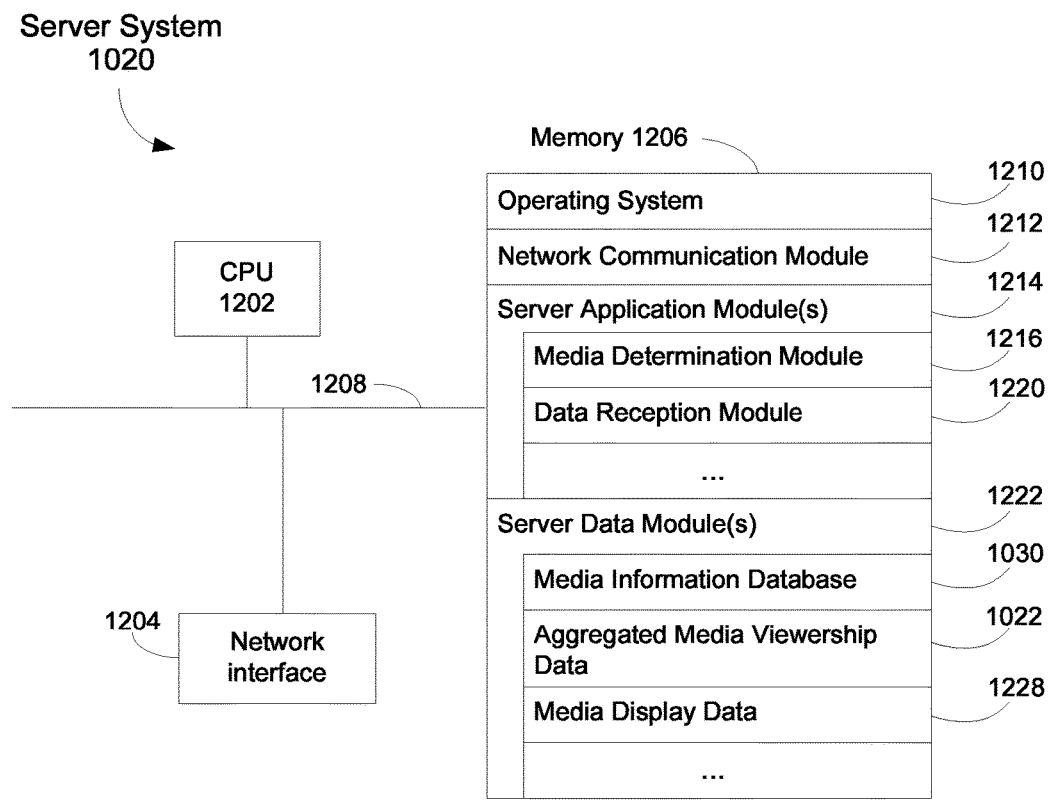
FIG. 12 is a block diagram of an event list received from a server system in accordance with some implementations.

FIG. 12 is a block diagram illustrating a server system 1020, in accordance with some implementations. The server system 1020 typically includes one or more processing units (CPU's) 1202, one or more network interfaces 1204, memory 1206, and one or more communication buses 1208 for interconnecting these components.

Memory 1206 includes high-speed random access memory, such as DRAM, SRAM, SGRAM or other random access solid state memory devices; and may include non-volatile memory, such as one or more magnetic disk storage devices, optical storage devices, flash memory devices, holographic data storage devices, or other non-volatile solid state storage devices. Memory 1206 may optionally include one or more storage devices remotely located from the CPU(s) 1202. Memory 1206, or alternately the non-volatile memory device(s) within memory 1206, includes a non-transitory computer readable storage medium. In some implementations, memory 1206 or the computer readable storage medium of memory 1206 stores the following programs, modules and data structures, or a subset thereof:

an operating system 1210 that includes procedures for handling various basic system services and for performing hardware dependent tasks;

a network communication module 1212 that is used for connecting the server system 120 to other computers via the one or more communication network interfaces 1204 (wired or wireless) and one or more communication networks, such as the Internet, other wide area networks, local area networks, metropolitan area networks, and so on;

one or more server application module(s) 1214 for enabling the server system 1020 to perform the functions offered by the server system 1020, including but not limited to:

a media determination module 1216 for determining the media being presented at a client system (FIG. 10, 1002), wherein the media being presented at a client system (FIG. 10, 1002) is determined by receiving the identification of the media from the client system (FIG. 10, 1002), analyzing the data being presented at the display (FIG. 10, 1004) associated with the client system (FIG. 10, 1002), or, in the case where the media presented at the client system (FIG. 10, 1002) is being provided by the server system 1020, determining the media being transmitted to the client system (FIG. 10, 1002);

a data reception module 1220 for receiving media viewership data 1012 from the client system (FIG. 10, 1002); and one or more server data module(s) 1222 for storing data related to the server system 1020, including but not limited to:

media information database 1030 including specific details about particular pieces of media, including, for example, the genre information, cast information, director information, event information, and other information related to specific media;

aggregated media viewership data 1022 including data from a plurality of users enrolled in a media viewership study and accompanying demographic information for each user in the plurality of users; and media display data 1228 including data for, when the server system 1020 provides media data to the client system (FIG. 10, 1002), displaying media content on a display.

Figure 13:
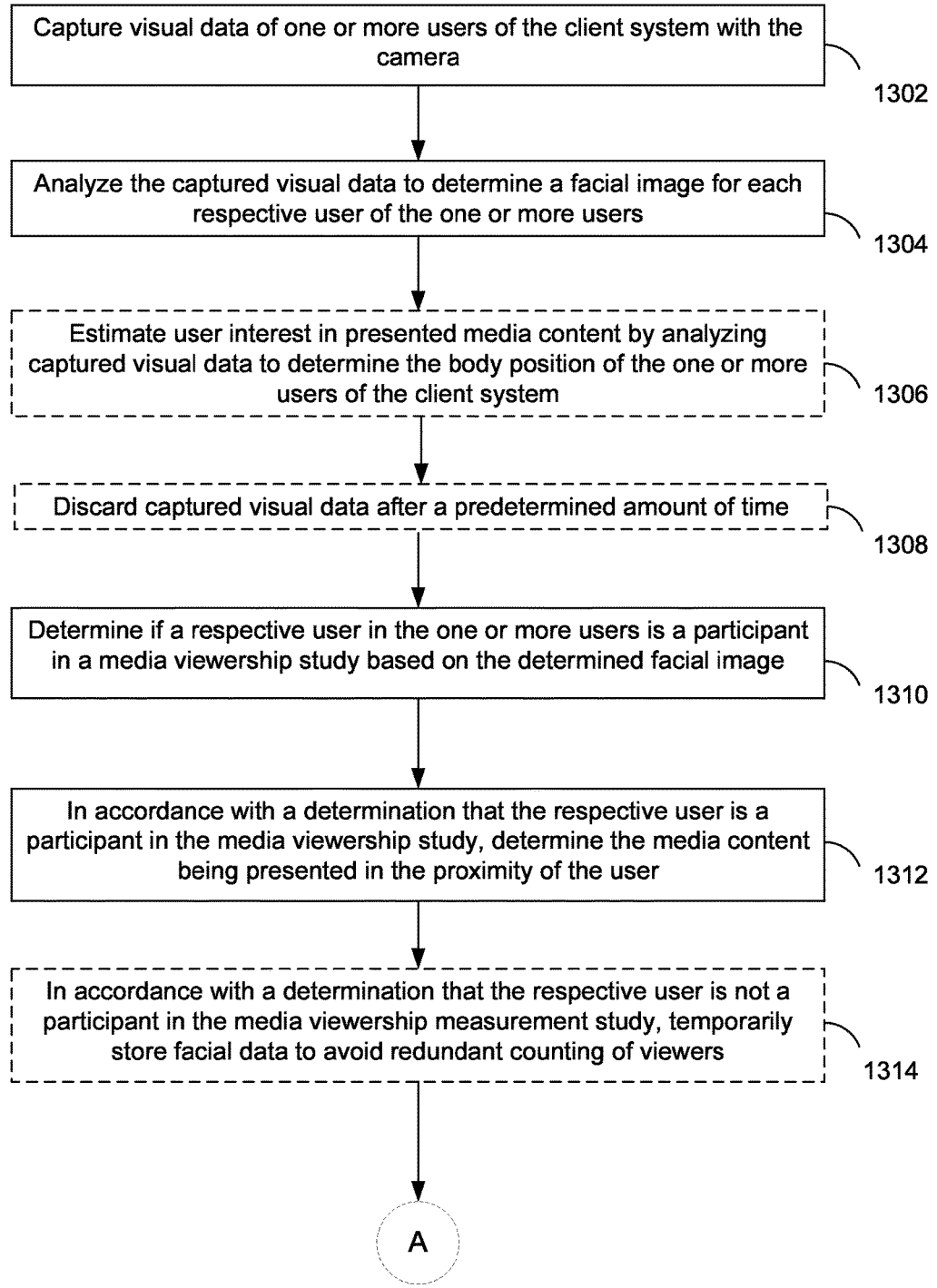
FIG. 13 is a flow diagram illustrating the process of monitoring audience attendance through facial recognition in accordance with some implementations.

FIG. 13 is a flow diagram illustrating the process of measuring viewership of media content, in accordance with some implementations. Each of the operations shown in FIG. 13 may correspond to instructions stored in a computer memory or computer readable storage medium. Optional operations are indicated by dashed lines (e.g., boxes with dashed-line borders). In some implementations, the method described in FIG. 13 is performed by the client system (FIG. 10, 1002).

In accordance with some implementations, the client system (FIG. 10, 1002) captures visual data of one or more users of the client system with the camera (1302). In some implementations the camera is infra-red sensitive and thus is able to capture accurate visual information in low lighting or dark situations. For example, when watching a movie in a dark living room, a normal camera will produce substandard visual data. An infra-red sensitive camera will capture high quality data even in poor lighting conditions.

In accordance with some implementations, the client system (FIG. 10, 1002) analyzes the captured visual data to determine a facial image for each respective user of the one or more users (1304). A facial image is an image that depicts at least the face of a user. The facial image also is sufficiently detailed to allow a facial recognition algorithm to identify specific users.

In accordance with some implementations, the client system (FIG. 10, 1002) estimates user interest in presented media content analyzing captured visual data to determine the body position of the one or more users of the client system (FIG. 10, 1002) (1306). For example, the client system (FIG. 10, 1002) determines that a user is facing away from the display screen. The client system (FIG. 10, 1002) estimates that the user has a low level of interest in the presented content and records the estimation. In some implementations the client system (FIG. 10, 1002) discards captured visual data after a predetermined amount of time (1308). The visual data is captured in the vicinity of the client device and thus may include images and information the user wishes to keep private. Thus, this visual data is never transmitted off the client system (FIG. 10 1002) and is removed from the system after some set period of time. For example, the client system (FIG. 10, 1002) removes visual data from memory 4 hours after the information is first captured.

In some implementations, the client system (FIG. 10, 1002) determines if a respective user in the one or more users is a participant in a media viewership study based on the determined facial image (1310). In some implementations the client system (FIG. 10, 1002) stores facial recognition data for the users enrolled in a viewership measurement survey. The client system (FIG. 10, 1002) then attempts to match the facial image with the facial recognition data stored on the client system (FIG. 10, 1002). The facial recognition data is gathered by submission by the enrolled users themselves or is captured when the user enrolls in the media viewership study.

In some implementations, in accordance with a determination that the respective user is a participant in the media viewership study, the client system (FIG. 10, 1002) determines the media content being presented in the proximity of the user (1312). The specific piece of media content currently being presented can include movies, television programs, advertisements, web videos, songs, music videos, etc. In some implementations, the client system (FIG. 10, 1002) determines the piece of media content by sending the time, location, and channel information to a server system (FIG. 10, 1020) and receiving the identification of the media content in return. In some implementations the client system (FIG. 10, 1002) is presenting the media content and thus is able to determine the piece of media content by examining the metadata transmitted with the media content. In some implementations the client system (FIG. 10, 1002) analyzes the audio of the media content to determine an audio fingerprint for the media content and then use the audio fingerprint to look up the identification of the content.

In some implementations, in accordance with a determination that the respective user is not a participant in the media viewership measurement study, the client system (FIG. 10, 1002) temporarily stores facial data to avoid redundant counting of viewers (1314). For example, the client system (FIG. 10, 1002) periodically captures visual data and analyzes it. One of the facts determined is the total number of users consuming the media content. If while a movie is being presented, the client system (FIG. 10, 1002) determines at a first time that there are 5 users enrolled in the study and 1 guest, the total number of users viewing the movie is 6. If the guest then leaves and another guest enters, the client system (FIG. 10, 1002) should then determine that a total of 7 unique users watched at least part of the movie. However, if the facial information for the guest is not retained, the client system (FIG. 10, 1002) will be unable to determine whether a new guest has entered or the same guest has remained. Thus temporarily storing the facial image of the guest prevents redundant counting.

Figure 14:
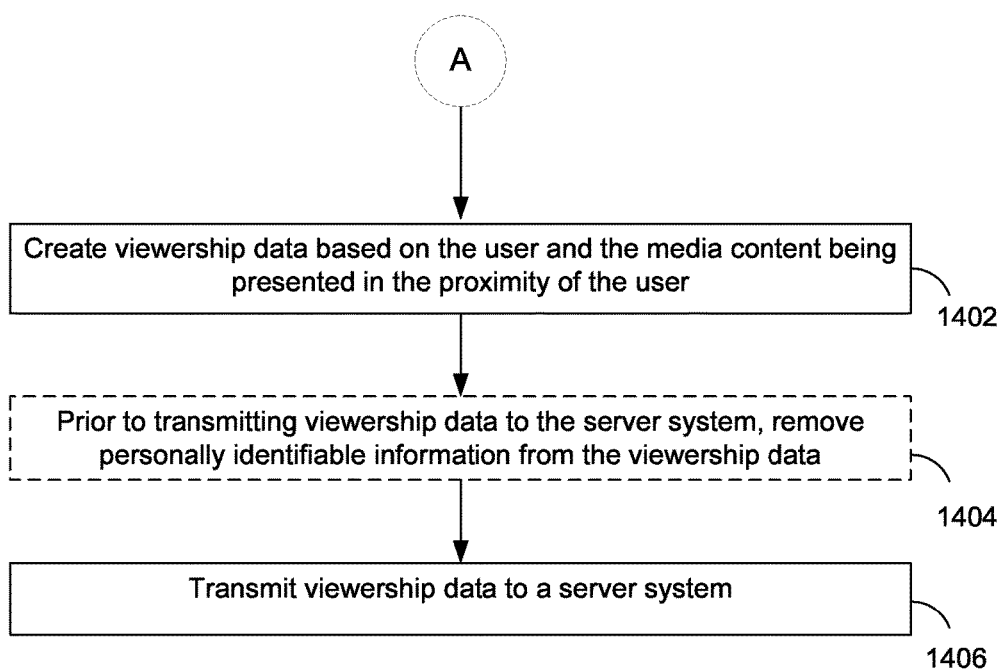
FIG. 14 is a flow diagram illustrating the process of monitoring audience attendance through facial recognition in accordance with some implementations.

FIG. 14 is a flow diagram illustrating the process of measuring viewership of media content, in accordance with some implementations. Each of the operations shown in FIG. 14 may correspond to instructions stored in a computer memory or computer readable storage medium. Optional operations are indicated by dashed lines (e.g., boxes with dashed-line borders). In some implementations, the method described in FIG. 14 is performed by the client system (FIG. 10, 1002).

In accordance with some implementations, the client system (FIG. 10, 1002) creates viewership data based on the user and the media content being presented in the proximity of the user (1402). In some implementations the viewership data contains a log of user viewing habits, including but not limited to the media content viewed, the time of viewing, the number of users present, and any other information relevant to users viewing habits. In some implementations the viewership data includes data concerning users who are not enrolled in a viewership study.

In accordance with some implementations, the client system (FIG. 10, 1002) removes personally identifiable information from the viewership data prior to transmitting viewership data to the server system (FIG. 10, 1020) (1404). As noted above, personally identifiable information includes, but is not limited to, names, addresses, birthdays, government issued ID numbers (such as a social security number or driver's license number), IP address, e-mail address, or social network account information.

In accordance with some implementations, the client system (FIG. 10, 1002) transmits the viewership data to a server system (FIG. 10, 1020). The server system (FIG. 10, 1002) then aggregates this information, along with viewership data from a plurality of other client systems to produce a large sample of viewership data that can be used to estimate total viewership for a plurality of pieces of media content.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for measuring viewership of media content, comprising:
   on a client system having one or more processors, a camera, and memory storing one or more programs for execution by the one or more processors:
      obtaining, from a participant database, facial recognition information for individuals who have agreed to participate in a media viewership totals measurement study, the facial recognition information including facial attribute data for the individuals;
      capturing, via the camera, visual data of one or more users of the client system;
      determining media content being presented in proximity to the one or more users;
      extracting from the captured visual data a facial image corresponding to each respective user of the one or more users; and
      for each extracted facial image:
         automatically determining, via a facial recognition algorithm, if the corresponding user is an individual who has agreed to participate in the media viewership totals measurement study, the determining including comparing facial features from the extracted facial image with the facial recognition information obtained from the participant database;
         in accordance with a determination that the corresponding user is an individual who has agreed to participate in the media viewership totals measurement study, generating first viewership data, the first viewership data including (i) demographic information of the individual, (ii) presence information of the individual, and (iii) information identifying the determined media content; and transmitting the first viewership data to a server system; and
         in accordance with a determination that the corresponding user is an individual who has not agreed to participate in the media viewership totals measurement study, generating second viewership data, the second viewership data including (i) presence information of the individual, and (ii) information identifying the determined media content and transmitting the second viewership data to a server system.

2. The method of claim 1 further comprising:
   in accordance with the determination that the corresponding user is an individual who has not agreed to participate in the media viewership totals measurement study, temporarily storing facial data of the individual to avoid redundantly counting the individual.

3. The method of claim 1 further comprising:
   analyzing captured visual data to determine respective body positions of the one or more users of the client system; and
   estimating user interest of the one or more users in the presented media content based on the respective body positions of the one or more users.

4. The method of claim 1 further comprising:
   discarding captured visual data after a predetermined amount of time.

5. The method of claim 1 further comprising:
   prior to transmitting the first or second viewership data to the server system, removing personally identifiable information from the first or second viewership data.

6. The method of claim 1, wherein capturing the visual data of one or more users of the client system comprises capturing infrared visual data.

7. The method of claim 1, wherein the participant database is stored on the client system.

8. An electronic device for determining viewer interest, comprising:
   one or more processors;
   a camera,
   memory storing one or more programs to be executed by the one or more processors;
   the one or more programs comprising instructions for:
      obtaining, from a participant database, facial recognition information for individuals who have agreed to participate in a media viewership totals measurement study, the facial recognition information including facial attribute data for the individuals;
      capturing, via the camera, visual data of one or more users of the electronic device;
      determining media content being presented in proximity to the one or more users;
      extracting from the captured visual data a facial image corresponding to each respective user of the one or more users; and
      for each extracted facial image:
         automatically determining, via a facial recognition algorithm, if the corresponding user is an individual who has agreed to participate in the media viewership totals measurement study, the determining including comparing facial features from the extracted facial image with the facial recognition information obtained from the participant database;
         in accordance with a determination that the corresponding user is an individual who has agreed to participate in the media viewership totals measurement study, generating first viewership data, the first viewership data including (i) demographic information of the individual, (ii) presence information of the individual, and (iii) information identifying the determined media content; and transmitting the first viewership data to a server system; and
         in accordance with a determination that the corresponding user is an individual who has not agreed to participate in the media viewership totals measurement study, generating second viewership data, the second viewership data including (i) presence information of the individual, and (ii) information identifying the determined media content and transmitting the second viewership data to a server system.

9. The electronic device of claim 8, further including instructions for:
   in accordance with the determination that the corresponding user is an individual who has not agreed to participate in the media viewership totals measurement study, temporarily storing facial data of the individual to avoid redundantly counting the individual.

10. The electronic device of claim 8, further including instructions for:
   analyzing captured visual data to determine respective body positions of the one or more users; and estimating user interest of the one or more users in the presented media content based on the respective body positions of the one or more users.

11. The electronic device of claim 8, further including instructions for:
discarding captured visual data after a predetermined amount of time.

12. The electronic device of claim 8, further including instructions for:
prior to transmitting the first or second viewership data to the server system, removing personally identifiable information from the first or second viewership data.

13. The electronic device of claim 8, wherein the camera is infrared sensitive.

14. The electronic device of claim 8, further comprising the participant database.

15. A non-transitory computer readable storage medium storing one or more programs configured for execution by an electronic device with a camera, the one or more programs comprising instructions for:
obtaining, from a participant database, facial recognition information for individuals who have agreed to participate in a media viewership totals measurement study, the facial recognition information including facial attribute data for the individuals;
capturing, via the camera, visual data of one or more users of the electronic device;
determining media content being presented in proximity to the one or more users;
extracting from the captured visual data a facial image corresponding to each respective user of the one or more users; and
for each extracted facial image:
automatically determining, via a facial recognition algorithm, if the corresponding user is an individual who has agreed to participate in the media viewership totals measurement study, the determining including comparing facial features from the extracted facial image with the facial recognition information obtained from the participant database;
in accordance with a determination that the corresponding user is an individual who has agreed to participate in the media viewership totals measurement study, generating first viewership data, the first viewership data including (i) demographic information of the individual, (ii) presence information of the individual, and (iii) information identifying the determined media content; and transmitting the first viewership data to a server system; and
in accordance with a determination that the corresponding user is an individual who has not agreed to participate in the media viewership totals measurement study, generating second viewership data, the second viewership data including (i) presence information of the individual, and (ii) information identifying the determined media content and transmitting the second viewership data to a server system.

16. The computer readable storage medium of claim 15 further including instructions for:
in accordance with the determination that the corresponding user is an individual who has not agreed to participate in the media viewership totals measurement study, temporarily storing facial data of the individual to avoid redundantly counting the individual.

17. The computer readable storage medium of claim 15 further including instructions for:
analyzing captured visual data to determine respective body positions of the one or more users of the electronic device; and
estimating user interest of the one or more users in the presented media content based on the respective body positions of the one or more users.

18. The computer readable storage medium of claim 15 further including instructions for:
discarding captured visual data after a predetermined amount of time.

19. The computer readable storage medium of claim 15 further including instructions for:
prior to transmitting the first or second viewership data to the server system, removing personally identifiable information from the first or second viewership data.

20. The computer readable storage medium of claim 15 wherein the participant database is stored on the electronic device.

21. The method of claim 1, further comprising:
for each extracted facial image, in accordance with the determination that the corresponding user is an individual who has not agreed to participate in the media viewership totals measurement study, counting and recording the presence of the corresponding user.

22. The electronic device of claim 8, further including instructions for:
for each extracted facial image, in accordance with the determination that the corresponding user is an individual who has not has agreed to participate in the media viewership totals measurement study, counting and recording the presence of the corresponding user.

23. The computer readable storage medium of claim 15 further including instructions for:
for each extracted facial image, in accordance with the determination that the corresponding user is an individual who has not agreed to participate in the media viewership totals measurement study, counting and recording the presence of the corresponding user.

* * * * *

UNITED STATES PATENT AND TRADEMARK OFFICE
CERTIFICATE OF CORRECTION

PATENT NO. : 10,134,048 B2
APPLICATION NO. : 14/454490
DATED : November 20, 2018
INVENTOR(S) : Deephanphongs et al.

Page 1 of 1

It is certified that error appears in the above-identified patent and that said Letters Patent is hereby corrected as shown below:

In the Claims

Claim 22, Column 30, Line 42, please delete "has not has agreed" and insert --has not agreed--.

Signed and Sealed this
Fifth Day of February, 2019

Andrei Iancu
*Director of the United States Patent and Trademark Office*